(12) United States Patent
Buckman et al.

(10) Patent No.: US 6,983,110 B2
(45) Date of Patent: Jan. 3, 2006

(54) COMPONENT CHARACTERISTIC TOLERANT AND COMPONENT ALIGNMENT TOLERANT OPTICAL RECEIVER

(75) Inventors: Lisa A. Buckman, Pacifica, CA (US); Ian Hardcastle, Sunnyvale, CA (US)

(73) Assignee: Agilent Technologies, Inc., Palo Alto, CA (US)

( * ) Notice: Subject to any disclaimer, the term of this patent is extended or adjusted under 35 U.S.C. 154(b) by 563 days.

(21) Appl. No.: 09/792,150

(22) Filed: Feb. 22, 2001

(65) Prior Publication Data

US 2002/0114049 A1    Aug. 22, 2002

(51) Int. Cl.
*H04B 10/06* (2006.01)

(52) U.S. Cl. .................. 398/212; 398/202; 398/153

(58) Field of Classification Search ............... 257/291, 257/292, 293; 398/212, 202, 153, 118, 214
See application file for complete search history.

(56) References Cited

U.S. PATENT DOCUMENTS

| | | | | |
|---|---|---|---|---|
| 3,825,730 A | * | 7/1974 | Worthington et al. ......... 377/53 |
| 5,077,814 A | * | 12/1991 | Shigematsu et al. .......... 385/24 |
| 5,214,527 A | | 5/1993 | Chang et al. ............... 398/202 |
| 6,367,989 B1 | * | 4/2002 | Hartman et al. ............. 385/89 |
| 6,373,606 B1 | * | 4/2002 | Nakama ..................... 398/87 |

FOREIGN PATENT DOCUMENTS

| | | |
|---|---|---|
| DE | 43 33 433 A1 | 9/1993 |
| EP | 0 571 132 A1 | 11/1993 |
| WO | WO 99/03218 | 7/1998 |

* cited by examiner

*Primary Examiner*—Christina Y. Leung
(74) *Attorney, Agent, or Firm*—Ian Hardcastle

(57) ABSTRACT

The optical receiver comprises an optical input path, a light detector array, an optical converging element and an information signal generator. The light detector array includes light detectors and a light-sensitive surface. Each light detector generates an electrical signal in response to light. The optical converging element is located to focus an optical input signal received via the optical input path to form a spot on the light-sensitive surface of the light detector array. The spot has an area less than the area of the light-sensitive surface but greater than the area of one of the light detectors. The information signal generator generates an electrical information signal from at least one of the electrical signals. In an embodiment, the information signal generator includes a summer that sums the electrical signals generated by the light detectors to generate the electrical information signal. In another embodiment, the information signal generator operates to identify the electrical signals generated in response to the optical input signal, to generate the electrical information signal from the electrical signals and to exclude from the electrical information signal ones of the electrical signals not identified as being generated in response to the optical input signal. In another embodiment, the information signal generator selects one of the identified electrical signals as the electrical information signal.

30 Claims, 7 Drawing Sheets

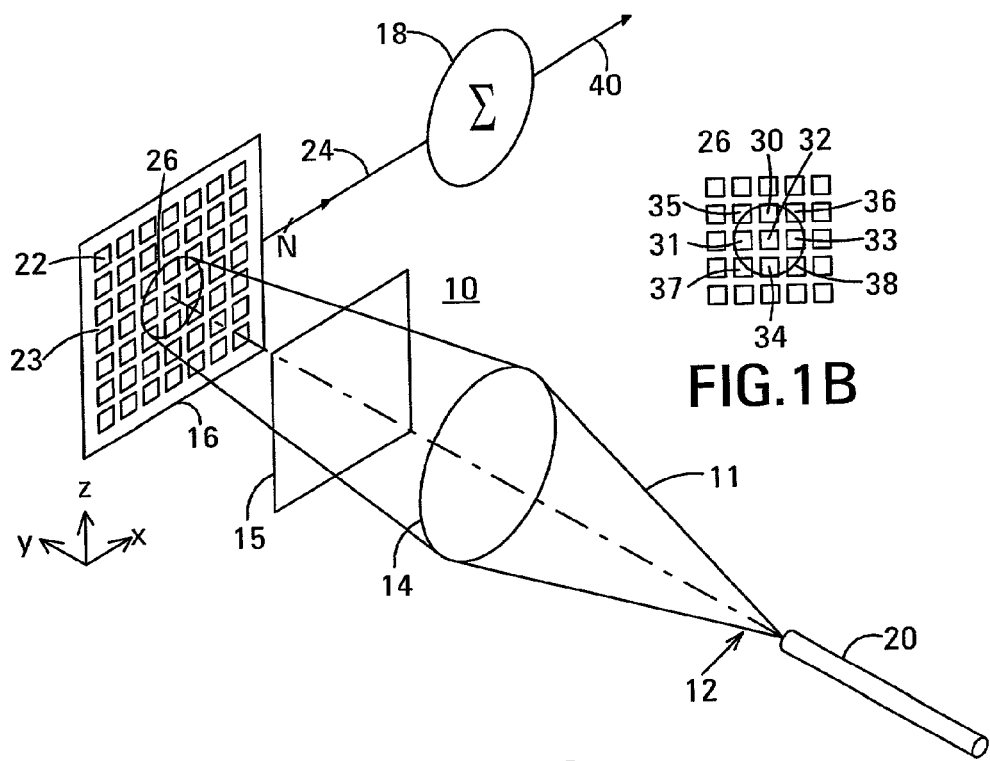
FIG.1A
FIG.1B
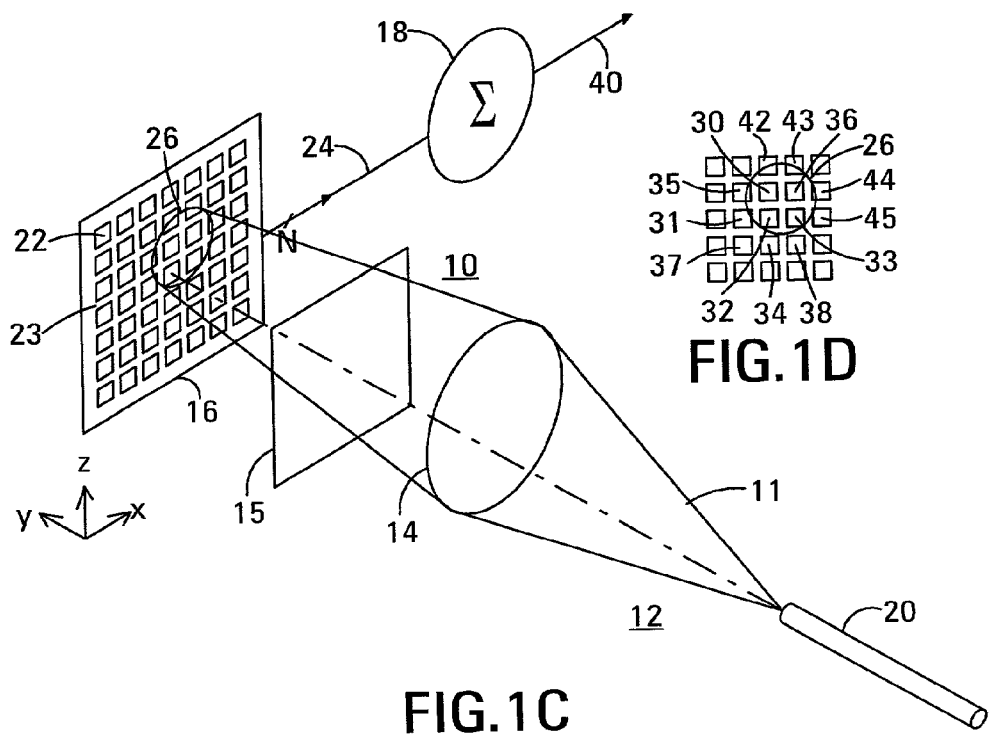
FIG.1C
FIG.1D

COMPONENT CHARACTERISTIC TOLERANT AND COMPONENT ALIGNMENT TOLERANT OPTICAL RECEIVER

BACKGROUND OF THE INVENTION

Optical signals are increasingly being used for transmitting information signals. One impediment to an even greater use of optical signals is that optical devices and electro-optical devices are often substantially more complex and expensive to manufacture than their electronic counterparts. The term optical devices will be used in this disclosure to denote both optical devices and electro-optical devices. This is because optical devices typically include a number of optical components that have to be precisely aligned relative to one another. Moreover, the optical devices have to be designed and manufactured so that their constituent optical components, once aligned, stay in alignment despite changes in environmental factors, such as temperature, vibration, etc.

One common optical device is the optical receiver that receives light, typically via an optical fiber, and detects the light to generate an electrical information signal that represents the information signal conveyed by the light. An optical receiver typically includes an input fiber, a converging optical element and a light detector. These components must have consistent optical and physical characteristics and must be accurately physically aligned relative to one another to ensure that the optical signal received via the optical fiber falls on the light detector. The need for the optical components to have consistent optical and physical characteristics and the need to align the optical components accurately relative to one another make a conventional optical receiver expensive to manufacture.

The component characteristics and alignment tolerances may be relaxed by increasing the area of the light-sensitive surface of the light detector. However, increasing the area of the light-sensitive surface increases the capacitance of the light detector. The capacitance of the light detector determines the maximum frequency of the information signal that can be recovered from the optical signal. A light detector that has a small enough capacitance to recover an information signal in the GHz frequency range may not have a large enough light-sensitive surface to allow the component characteristics and alignment tolerances to be significantly relaxed. Also, portions of the detector not illuminated by the optical signal may generate sufficient noise to degrade the signal-to-noise ratio of the electrical information signal output by the light detector.

The optical signal received via the optical fiber may be a multi-frequency optical signal, such as a wave-division multiplexed (WDM) optical signal or a dense wave-division multiplexed (DWDM) optical signal. In this case, the optical receiver typically additionally includes a frequency-dispersive element, such as a diffraction grating, and a light detector for each optical frequency included in the multi-frequency optical signal. The light detectors may be configured as a detector array having one detector element for each optical frequency. An optical receiver for a multi-frequency optical signal has component characteristics and alignment tolerances at least as severe as those of an optical receiver for a single-frequency optical signal. Morever, it is more difficult to use a large-area light detector in an attempt to relax the component characteristics and alignment tolerances in such an optical receiver.

Therefore, what is needed is an optical receiver having relaxed component characteristic tolerances and relaxed alignment tolerances and that is capable of detecting a high-frequency information signal conveyed by the optical signal. What is also needed is such an optical receiver that is additionally capable of generating an electrical information signal having a high signal-to-noise ratio. Finally, what is also needed is such an optical receiver that is additionally capable of receiving a multi-frequency optical signal and generating an information signal from each of the optical frequencies.

SUMMARY OF THE INVENTION

In one aspect, the invention provides an optical receiver that comprises an optical input path, a light detector array, an optical converging element and an information signal generator. The light detector array includes light detectors and a light-sensitive surface. Each light detector generates an electrical signal in response to light. The optical converging element is located to focus an optical input signal received via the optical input path to form a spot on the light-sensitive surface of the light detector array. The spot has an area less than the area of the light-sensitive surface but greater than the area of one of the light detectors. The information signal generator generates an electrical information signal from at least one of the electrical signals. The information signal generator operates to identify the electrical signals generated in response to the optical input signal, to generate the electrical information signal from the electrical signals, to exclude from the electrical information signal ones of the electrical signals not identified as being generated in response to the optical input signal, and not to exclude from the electrical information signal the electrical signals generated by at least one of the following: those of the light detectors surrounding the illuminated light detectors; those of the light detectors located in a regular block that includes the illuminated light detectors, the block being regular in terms of an addressing scheme of the light detector array; and those of the light detectors surrounding the regular block that includes the illuminated light detectors.

In another aspect, the invention provides an optical receiver that comprises an optical input path; a light detector array; an optical converging element an information signal generator and a sampling and multiplexing circuit. The light detector array has a light-sensitive surface and light detectors each generating an electrical signal in response to light. The optical converging element is located to focus an optical input signal received via the optical input path to form a spot on the light-sensitive surface of the light detector array. The spot has an area less than the area of the light-sensitive surface but greater than the area of one of the light detectors. The information signal generator generates an electrical information signal from at least one of the electrical signals. The sampling and multiplexing circuit delivers samples of the electrical signals generated by the light detectors to the information signal generator.

In an embodiment, the sampling and multiplexing circuit has a general sampling mode and a selective sampling mode. In the general sampling mode, the sampling and multiplexing circuit delivers samples of the electrical signals generated by all of the light detectors to the information signal generator. The information signal generator uses the samples to identify the illuminated light detectors that generate an electrical signal in response to the optical input signal. In the selective sampling mode, the sampling and multiplexing circuit delivers to the information signal generator samples of at least one of the electrical signals generated by the illuminated light detectors. The information signal generator generates the electrical information signal from the samples received from the sampling and multiplexing circuit in its selective sampling mode.

In another embodiment, the optical receiver comprises at least one configurable, substantially static signal path extending between the light detector array and the information signal generator. Each of the at one least configurable, substantially static signal path is configurable to connect The electrical signal generated by one of the light detectors to the information signal generator. The information signal generator uses the samples of the electrical signals generated by the light detectors and delivered by the sampling and multiplexing circuit to identify the illuminated light detectors that generate an electrical signal in response to the optical input signal. The information signal generator operates to configure the at least one configurable, substantially static signal path to connect the electrical signal generated by one of the illuminated light detectors to the information signal generator. The information signal generator generates the electrical information signal from the electrical signal received via each of the at least one configurable, substantially static signal path.

In yet another aspect, the invention provides a method for generating an electrical information signal from an optical input signal modulated with an information signal. In the method, a light detector array as described above is provided. The optical input signal is optically converged to form a spot on the light-sensitive surface of the light detector array. The spot has an area less than the area of the light-sensitive surface but greater than the area of one of the light detectors. The electrical information signal is generated from at least one of the electrical signals generated by the light detectors. Generating the electrical information signal includes identifying the electrical signals generated in response to the optical input signal, excluding from the electrical information signal ones of the electrical signals not identified as being generated in response to the optical input signal and not excluding from the electrical information signal the electrical signals generated by at least one of the following: those of the light detectors surrounding the illuminated light detectors; those of the light detectors located in a regular block that includes the illuminated light detectors, the block being regular in terms of an addressing scheme of the light detector array; and those of the light detectors surrounding the regular block.

In yet another aspect, the invention also provides a method for generating an electrical information signal from an optical input signal modulated with an information signal. In the method, a light detector array as described above is provided. The optical input signal is optically converged to form a spot on the light-sensitive surface of the light detector array. The spot has an area less than the area of the light-sensitive surface but greater than the area of one of the light detectors. The electrical information signal is generated from at least one of the electrical signals generated by the light detectors. The electrical signals generated by the light detectors are subject to sampling and multiplexing.

In an embodiment, the electrical information signal is generated by performing general sampling and multiplexing to provide samples of the electrical signals generated by substantially all of the light detectors. The samples provided by the general sampling and multiplexing are used to identify illuminated ones of the light detectors that generate an electrical signal in response to the optical input signal. Selective sampling and multiplexing is then performed to provide samples of at least one of the electrical signals generated by the illuminated light detectors. The electrical information signal is generated from the samples provided by the selective sampling and multiplexing.

The electrical information signal may be generated by performing sampling and multiplexing to provide samples of the electrical signals generated by substantially all of the light detectors. The samples provided by the sampling and multiplexing are used to identify illuminated ones of the light detectors that generate an electrical signal in response to the optical input signal. Each of at least one configurable, substantially static signal path is configured to connect to one of the illuminated light detectors. The electrical signal from one of the illuminated light detectors is received via each of the at least one configurable, substantially static signal path. The electrical information signal is generated from the electrical signal received via each of the at least one configurable, substantially static signal path.

The area of the light detector array is large compared with that of the spot. The light detector array will generate electrical signals in response to the optical input signal provided that the component characteristic tolerances and the alignment tolerances are such that the spot is located somewhere on its light-sensitive surface. This enables the optical receiver to be manufactured at low cost using components having characteristics with wide tolerances and assembled with wide alignment tolerances.

The electrical information signal is generated from the electrical signals generated by the light detectors. Each of the light detectors of the light detector array is smaller than the spot and is capable of generating an electrical signal in response to the optical input signal modulated with a high-frequency information signal. As a result, the electrical information signal can have a wide bandwidth. Moreover, the electrical signals not generated in response to the optical input signal can be excluded from the electrical information signal, so that the signal-to-noise ratio of the electrical information signal is not degraded by noise contributed by the light detectors in the part of the light detector array not illuminated by the optical input signal.

BRIEF DESCRIPTION OF THE DRAWINGS

FIG. 1A is a schematic drawing of a "nominal" example of a first embodiment of an optical receiver according to the invention.

FIG. 1B is an enlarged view of part of the light sensitive surface of the light detector array of the optical receiver shown in FIG. 1A.

FIG. 1C is a schematic drawing of an example of the first embodiment of an optical receiver according to the invention in which one of the components has an alignment error.

FIG. 1D is an enlarged view of part of the light sensitive surface of the light detector array of the optical receiver shown in FIG. 1C.

DETAILED DESCRIPTION OF THE INVENTION

Figures 2A, 2B, 2C, 2D:
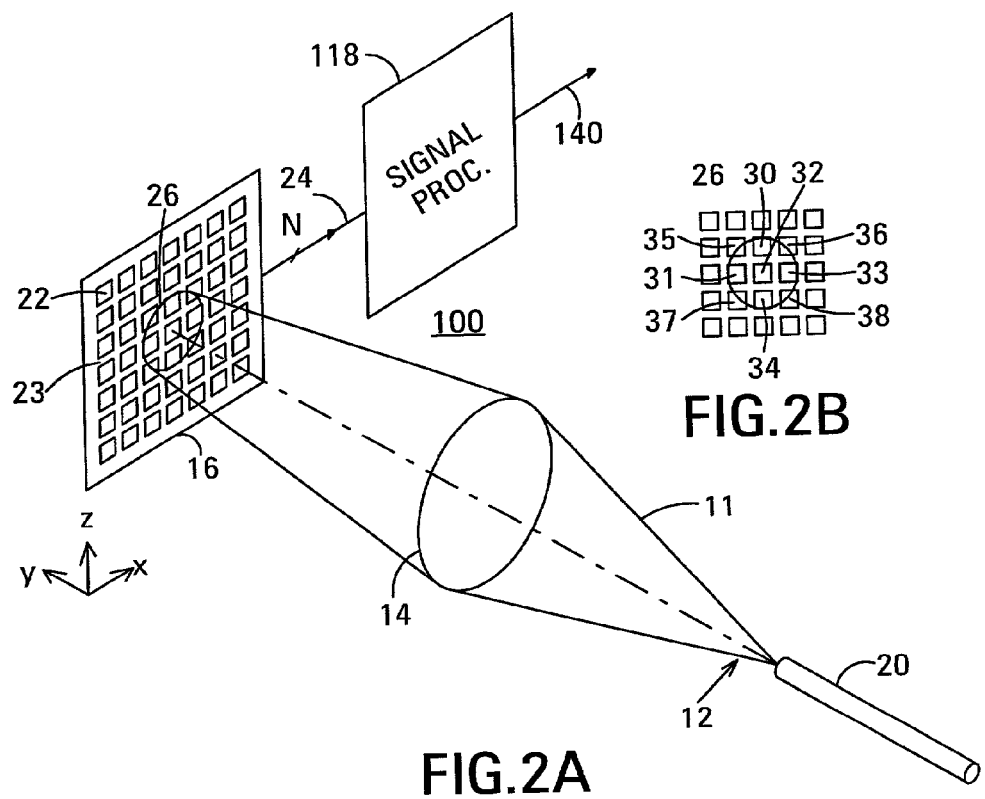
FIG. 2A is a schematic drawing of a "nominal" example of a second embodiment of an optical receiver according to the invention.
FIG. 2B is an enlarged view of part of the light sensitive surface of the light detector array of the optical receiver shown in FIG. 2A.
FIG. 2C is a schematic drawing of an example of the second embodiment of an optical receiver according to the invention in which one of the components has an alignment error.
FIG. 2D is an enlarged view of part of the light sensitive surface of the light detector array of the optical receiver shown in FIG. 2C.

FIGS. 1A and 1B show a first embodiment 10 of an optical receiver according to the invention. FIGS. 1A and 1B show an example in which the optical components constituting the optical receiver have optical and physical characteristics that lie at the center of their respective tolerances and the optical receiver is assembled with its components aligned at the centers of their respective tolerances. FIGS. 1C and 1D, which will be described below, show an example in which the optical receiver is assembled with one of its components having a typical alignment error within the tolerance of this alignment.

The optical receiver 10 is composed of the optical input path 12, the optical converging element 14, the light detector array 16 and the information signal generator 18. In this embodiment, the information signal generator is composed of a summer that generates the electrical information signal by summing the electrical signals generated by the light detectors constituting the light detector array.

The optical receiver 10 receives the optical input signal 11 via the optical input path 12. The optical input path may be a physical element: in the example shown, the optical fiber 20 constitutes the optical input path. An optical waveguide could alternatively be used. Alternatively, the optical input path may be the path in which the optical input signal enters the optical receiver by free-space transmission.

The optical converging element 14 may be a convex lens, a concave mirror, a GRIN lens, a diffractive optical element or some other suitable optical element capable of converging light received via the optical input path 12 onto the light sensor array 16.

The light detector array 16 has a light-sensitive surface 23. The light detector array is composed of a two-dimensional arrangement of N individual light detectors. An exemplary light detector is shown at 22. The light detectors have dimensions that depend, in part, on the maximum frequency of the information signal with which the optical input signal 11 is modulated. A higher maximum modulation frequency requires that the light detectors each have a smaller capacitance, and therefore a smaller area. The area of each of the individual light detectors is smaller than that of the light-sensitive surface 23. Consequently, the capacitance of each of the individual light detectors is smaller than that of a light detector having an area equal to that of the light-sensitive surface.

The optical input path 12, the optical converging element 14 and the light detector array 16 are arranged with the optical converging element interposed between the optical input path and the light detector array The optical converging element converges the optical input signal 11 to form the spot 26 on the light-sensitive surface 23 of the light detector array The area of the spot is substantially less than the area of the light-sensitive surface but is greater than the area of one of the individual light detectors, such as the light detector 22. In the example shown in FIG. 1A, the spot fully covers the light detectors 30, 31, 32, 33 and 34, and partially covers the light detectors 35, 36, 37 and 38 shown in the enlarged view of FIG. 1B. Thus, the light detectors 30, 31, 32, 33 and 34 are fully illuminated by the optical input signal, the light detectors 35, 36, 37 and 38 are partly illuminated and the remaining light detectors are not illuminated.

Each of the light detectors of the light detector array 16 individually and substantially independently generates an electrical signal in response to light falling on it. Thus, only the light detectors 30–38 generate an electrical signal in response to the optical input signal 11.

The electrical signal generated by each of the light detectors of the light detector array 16 is coupled to the information signal generator 18. An electrical connection that extends from the light detector array to the information signal generator is shown schematically at 24. The electrical connection includes one or more electrical conductors. Each electrical conductor may carry one of the electrical signals. Alternatively, the light detector array may multiplex the electrical signals before feeding them to the information signal generator via the electrical connection.

The information signal generator 18 receives the electrical signal from each light detector in the light detector array 16 and sums the electrical signals to generate the electrical information signal 40.

In the example shown in FIG. 1A, the spot 26 fully covers the light detectors 30–34. Since the light detectors 30–34 are fully illuminated by the optical input signal, the electrical signals generated by these light detectors are the main contributors to the electrical information signal 40. In addition, the spot covers part of each of the light detectors 35–38. These light detectors are partially illuminated by the optical input signal. The electrical signals generated by the partially-illuminated light detectors 35–38 additionally contribute to the electrical information signal.

The electrical signals generated by the remaining light detectors of the light detector array 16 additionally contribute to the electrical information signal 40. Since these electrical signals are not generated in response to the optical input signal 11, they contribute noise to the electrical information signal. However, these electrical signals are typically small in amplitude, so that the signal-to-noise ratio of the electrical information signal will be acceptable for many applications.

As noted above, FIG. 1A shows a "nominal" example of the optical receiver 10. All of the components of the nominal example, i.e., the optical input path 12, the optical converging element 14, the light detector array 16, have "nominal" optical and physical characteristics, i.e., characteristics that lie at the center of their respective tolerances. The nominal example is assembled with all of its components aligned at the centers of their respective alignment tolerances.

FIG. 1C shows an example of the optical receiver 10 in which the components of the optical receiver have optical and physical characteristics that lie at the centers of their respective tolerances. However, the optical receiver has been assembled with the optical converging element 14 located at a position in the x-z plane that differs from the center of its tolerance. The optical receiver shown in FIG. 1C is an example of an optical receiver assembled with a normal manufacturing tolerance in the position of one of its components. As a result of the positional error, the spot 26 covers an area of the light-sensitive surface 23 different from that covered by the spot in the ("nominal" example shown in FIG. 1A, and the light detectors illuminated by the optical input signal 11 differ from those illuminated in the example shown in FIG. 1A. The light detectors 30, 32, 33 and 36 are fully illuminated by the optical input signal and the light detectors 31, 35, 42, 43, 44 and 45 are partially illuminated, as shown in the close-up view of FIG. 1D.

The information signal generator 18 receives the electrical signal from each light detector in the light detector array 16 and sums the electrical signals to generate the electrical information signal 40. In this example, the information signal generator generates the electrical information signal principally from the electrical signals generated by the fully-illuminated light detectors 30, 32, 33 and 36. The electrical signals generated by the partially-illuminated light detectors 31, 35, 42, 43, 44 and 45 additionally contribute to the electrical information signal. The electrical signals generated by the remaining light detectors of the light detector array 16 also contribute to the electrical information signal 40. Since these electrical signals are not generated in response to the optical input signal 11, they contribute noise to the electrical information signal. However, these electrical signals are typically small in amplitude, so that the signal-to-noise ratio of the electrical information signal will be acceptable for many applications.

The optical receiver 10 can be manufactured easily and inexpensively using components whose optical and physical characteristics have wide tolerances and that are assembled with wide alignment tolerances. Such wide tolerances lead the position of the spot 26 on the light-sensitive surface 23 differing substantially between production samples. However, by using a light detector array whose area is sufficiently large that the spot will be located somewhere on its light-sensitive surface under worst-case combinations of the component and alignment tolerances, the optical receiver will generate the electrical information signal 40 regardless of these tolerances. A conventional, single large-area light detector would have a high capacitance that would impose an undesirable limit on the maximum frequency of the electrical information signal. This frequency limit is overcome by using a large-area light detector array composed of many individual light detectors. The area of each individual light detector is small compared with that of the light detector array, so that the individual light detectors are capable of generating electrical signals having a maximum frequency substantially higher than that of a large-area light detector similar in area to the light detector array. The electrical information signal generated by summing the electrical signals has a maximum frequency similar to that of the electrical signals generated by individual light detectors.

When a multimode optical fiber or a multimode waveguide is used as the input path 20, the total energy of the optical input signal 11 summed over the area of the spot 26 remains constant, but the spatial energy distribution of the optical input signal within the spot may vary with time. This temporal variation is known in the art as speckle.

Speckle will cause corresponding temporal variations in the amplitudes of the electrical signals generated by the light detectors illuminated by the optical input signal 11. These variations are known in the art as modal noise. Unless the area of the gaps between adjacent ones of the light detectors covered by the spot is a negligible fraction of the area of the spot, the temporal variations in the amplitudes of the electrical signals generated by the illuminated light detectors will cause corresponding temporal variations in the amplitude of the electrical information signal 40 when the electrical information signal is generated by summing the electrical signals generated by the light detectors. These temporal variations may be undesirable.

FIGS. 1A and 1C show the optional mode scrambler 15 located between the optical input path 12 and the light detector array 16. In the example shown, the mode scrambler is located between the optical converging element 14 and the light detector array 16. However, the mode scrambler may alternatively be located between the optical input path and the optical converging element.

The mode scrambler 15 is optional in the sense that it is not required when the optical input signal 11 is not subject to speckle, or when the area of the gaps between adjacent ones of the light detectors covered by the spot 26 is a negligible fraction of the area of the spot, or when modal noise in the electrical information signal 40 is acceptable. On the other hand, there is no requirement that the mode scrambler be omitted when any one or more of the above conditions is met.

The mode scrambler 15 creates a spatially-uniform distribution of the optical input signal 11 in the spot 26. Examples of a mode scrambler include a diffractive optical element (DOE) and an optical diffuser.

Although not shown in the drawings of the embodiments of the optical receiver according to the invention to be described below, these embodiments may also additionally include a mode scrambler.

FIGS. 2A and 2B show a second embodiment 100 of an optical receiver according to the invention. FIGS. 2A and 2B show a "nominal" example, as described above. FIGS. 2C and 2D, which will be described below, show an example in which the optical receiver 100 is assembled with one of its components having a typical alignment error within the tolerance of this alignment. Elements of the optical receiver 100 shown in FIGS. 2A–2D that correspond to elements of the optical receiver 10 shown in FIGS. 1A–1D are indicated using the same reference numerals and will not be described again here.

In this second embodiment, the information signal generator 118 excludes from the electrical signal at least some of the electrical signals that are not generated in response to the optical input signal 11. This enables the information signal to be generated with an increased signal-to-noise ratio that has little dependence on the location of the spot on the light-sensitive surface.

In the optical receiver 100, the electrical signal generated by each of the light detectors of the light detector array 16 is coupled to the information signal generator 118 by the electrical connection 24. The information signal generator receives the electrical signals from the light detector array and generates the electrical information signal 140 in response to the electrical signals. In generating the electrical information signal, the information signal generator excludes from the electrical information signal ones of the electrical signals not generated in response to the optical input signal 11. For example, the information signal generator may exclude those of the electrical signals that are generated by the light detectors not illuminated, or weakly illuminated, by the optical input signal. This prevents noise generated by the non-illuminated or weakly-illuminated light detectors from degrading the signal-to-noise ratio of the electrical information signal.

In the example shown in FIG. 2A, the spot 26 fully covers the light detectors 30–34, as shown in the detail view of FIG. 2B. Since these light detectors are fully illuminated by the optical input signal 11, the information signal generator 118 generates the electrical information signal 140 from the electrical signals generated at least by the light detectors 30–34.

The spot 26 also covers part of each of the light detectors 35–38. These light detectors are partially illuminated by the optical input signal 11. The information signal generator 118 may additionally generate the electrical information signal from the electrical signals generated by the partially-illuminated light detectors. The information signal generator 118 may be configured to exclude from the electrical information signal the electrical signals generated by those of the partially-illuminated light detectors whose electrical signal has a signal-to-noise ratio below that which would increase the overall signal-to-noise ratio of the electrical information signal.

FIG. 2A shows a "nominal" example of the optical receiver 100. All of the components of the nominal example have "nominal" optical and physical characteristics, and the nominal example is assembled with all of its components aligned at the centers of their respective alignment tolerances. The information signal generator 118 excludes from the electrical information signal 140 ones of the electrical signals not generated in response to the optical input signal 11.

In an embodiment, the information signal generator 118 excludes the electrical signals generated by the non-illuminated light detectors from contributing to the electrical information signal 140, and additionally excludes the electrical signals generated by the partially-illuminated light detectors 35–338 from the electrical information signal under the conditions described above. Thus, the information signal generator generates the electrical information signal principally in response to the electrical signals generated by those of the light detectors that are fully illuminated by the optical input signal 11, i.e., the light detectors 30–34.

FIG. 2C shows an example of the optical receiver 100 in which the components of the optical receiver have optical and physical characteristics that lie at the centers of their respective tolerances. However, the optical receiver has been assembled with the optical converging element 14 located at a position in the x-z plane that differs from the center of its tolerance. The optical receiver shown in FIG. 2C is an example of an optical receiver assembled with a normal manufacturing tolerance in the position of one of its components. As a result of the positional error, the spot 26 covers an area of the light-sensitive surface 23 different from that covered by the spot in the "nominal" example shown in FIG. 2A, and the light detectors illuminated by the optical input signal 11 differ from those illuminated in the example shown in FIG. 2A. The light detectors 30, 32, 33 and 36 are fully illuminated by the optical input signal and the light detectors 31, 35, 42, 43, 44 and 45 are partially illuminated, as shown in the close-up view of FIG. 2D.

In an embodiment, the information signal generator 118 excludes the electrical signals generated by the non-illuminated light detectors from contributing to the electrical information signal 140, and additionally excludes the electrical signals generated by the partially-illuminated light detectors 31, 35, 42, 43, 44 and 45 from the electrical information signal under the conditions described above. Thus, the information signal generates the electrical information signal 140 principally from the electrical signals generated by the fully-illuminated light detectors 30, 32, 33 and 36.

In the example shown in FIGS. 2C and 2D, the non-illuminated light detectors include the light detector 34 whose electrical signal contributed to the electrical information signal in the example shown in FIGS. 2A and 2B. Excluding the electrical signals generated by the non-illuminated or weakly-illuminated light detectors from contributing to the electrical information signal prevents these electrical signals from degrading the signal-to-noise ratio of the electrical information signal.

The advantages of using a large-area array of small light detectors to receive the optical input signal are described above with reference to the first embodiment shown in FIGS. 1A–1D. The second embodiment shown in FIGS. 2A–2D has similar advantages. In addition, the second embodiment generates the electrical information signal 140 with a high signal-to-noise ratio that is substantially independent of the location of the spot on the light-sensitive surface of the light detector array. The signal-to-noise ratio of the electrical information signal generated by the example shown in FIG. 2C is comparable with that of the electrical information signal generated by the "nominal" example shown in FIG. 2A notwithstanding the different alignment of the optical converging element 14.

Moreover, as long as the optical receiver 100 is fabricated from components having optical and physical characteristics that lie within their respective tolerances and is assembled with the components aligned within their respective alignment tolerances such that the spot 26 is located somewhere on the light-sensitive surface 23, the optical receiver will generate the electrical information signal 140 with a signal-to-noise ratio substantially equal to that of the electrical information signal generated by the "nominal" example shown in FIG. 2A. The invention therefore allows the optical receiver to be made more simply and less-expensively using wider-tolerance components assembled with wider alignment tolerances than a conventional optical receiver.

Figure 3A:
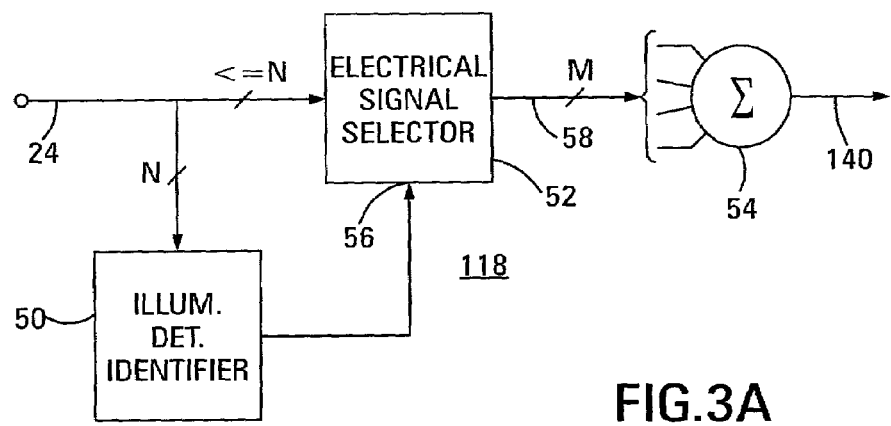
FIG. 3A is a block diagram of a first exemplary embodiment of the information signal generator of the optical receiver shown in FIGS. 2A–2D.

FIG. 3A is a block diagram showing a simplified example of a first embodiment of the information signal generator

118, which will be described with additional reference to FIG. 2A. This embodiment of the information signal generator identifies the electrical signals generated by the light detectors illuminated by the optical input signal and generates the electrical information signal by excluding at least some of the electrical signals generated by the light detectors not illuminated by the optical input signal 11. The information signal generator may be fabricated in the same substrate as the light detector array 16, or may be a separate component electrically connected to the light detector array. As a further alternative, parts of the information signal generator may be integral with the light detector array, as will be described below.

The information signal generator 118 is composed of the illuminated detector identifier 50, the electrical signal selector 52 and the summer 54. The electrical signal selector and the illuminated detector identifier each have inputs connected by the electrical connection 24 to the light detector array 16. The input of the illuminated detector identifier receives the electrical signals generated by the N light detectors of the light detector array via the electrical connection 24. The input of the electrical signal selector receives the electrical signals generated by the N light detectors, or a subset of them, via the electrical connection 24. The inputs of the illuminated detector identifier and the electrical signal selector may be connected to different physical or temporal elements of the electrical connection 24.

The illuminated detector identifier 50 has an output connected to the control input 56 of the electrical signal selector 52. The output of the electrical signal selector 52 is connected by the electrical connection shown schematically at 58 to the summer 54. The electrical connection 58 may include multiple physical or temporal elements.

The summer 54 sums the electrical signals output by the electrical signal selector to generate the electrical information signal 140. The summer is shown as having M inputs, one for each of the maximum number of electrical signals that are summed to generate the electrical information signal. This depends on the size of the light detectors, such as the light detector 22, in relation to the size of the spot 26. In the example shown in FIG. 3A, M=4.

The illuminated detector identifier 50 receives an electrical signal from each of the N light detectors of the light detector array 16. The illuminated detector identifier identifies each of the light detectors that is illuminated by the optical input signal 11 and generates identity information representing the result of this determination. The illuminated detector identifier feeds the identity information identifying the illuminated light detectors to the electrical signal selector 52. The electrical signal selector additionally receives the electrical signals from the light detectors. In response to the identity information, the electrical signal selector excludes from the electrical signals fed to the summer 54 at least some of the electrical signals not generated in response to the optical input signal. For example, the electrical signal selector may select and feed to the summer 54 the electrical signals generated by only those of the light detectors that are identified by the identity information as being illuminated by the optical input signal. This effectively excludes from the electrical information signal 140 the electrical signals generated by ones of the light detectors not illuminated by the optical input signal. The summer sums the electrical signals received from the electrical signal selector to generate the electrical information signal 140.

During operation of the optical receiver 100, temperature and other changes may change the location, the size or both the location and the size of the spot 26 on the light-sensitive surface 23. Such change may be sufficient to change the identity of the light detectors illuminated by the optical input signal 11. Accordingly, the illuminated detector identifier 50 may operate from time-to-time to re-determine the identities of the illuminated light detectors and, if necessary, make corresponding changes to the identity information. The electrical signal selector 52 then excludes from the electrical information signal the electrical signals not identified by the changed identity information.

The illuminated detector identifier 50 generates the identity information by examining the electrical signals received from the light detector array 16 via the electrical connection 24. For example, the illuminated detector identifier may identify the light detectors illuminated by the optical input signal 11 by determining which of the electrical signals has a level greater than a predetermined threshold. The predetermined threshold may correspond to a signal level below which the electrical signal has a signal-to-noise ratio insufficient to increase the signal-to-noise ratio of the electrical information signal 140, for example. Electrical signals having a signal level less than the threshold level are then regarded as electrical signals not generated in response to the optical input signal. The illuminated detector identifier may additionally or alternatively measure the signal-to-noise ratio of each of the electrical signals.

The identity information generated by the illuminated detector identifier 50 may be composed of the coordinates of the identified light detectors in the light detector array 16, for example. Alternatively, the illuminated detector identifier may generate a set of binary signals each corresponding to one light detector in the light detector array The state to which each binary signal is set indicates whether or not the corresponding light detector is an illuminated light detector. The signals may be arranged in series, in parallel or as a series of parallel words in the identity information.

The illuminated detector identifier 50 may alternatively operate in a mode inverse to that just described to generate identity information that identifies the non-illuminated light detectors.

As another example, the illuminated detector identifier 50 may use a pattern recognition process to generate the identity information. In this case, the illuminated detector identifier determines which of the electrical signals received from the light detector array 16 has been generated by an illuminated light detector by, for example, determining whether the electrical signal has a level greater than a predetermined threshold. In response to this determination, the illuminated detector identifier generates an N-bit input pattern, where N is the number of light detectors in the light detector array. Each bit corresponds to one of the light detectors. A 1 in the input pattern may indicate that the corresponding light detector is illuminated whereas a 0 may indicate that the corresponding light detector not illuminated, for example.

In each of the illuminated detector identifier 50 and the electrical signal selector 52, a memory (not shown) stores a number of N-bit reference patterns, each identified by a unique identity code. Each reference pattern corresponds to the input pattern resulting from a different one of all the possible (or likely) sizes and locations of the spot 26 on the light-sensitive surface 23.

The illuminated detector identifier 50 compares the input pattern to the reference patterns stored in its memory to determine which of the reference patterns most closely matches the input pattern. The illuminated detector identifier feeds the identity code of the most-closely matching reference pattern to the electrical signal selector 52 as the identity information.

The electrical signal selector 52 retrieves from its memory the reference pattern identified by the identity code. The 1s or 0s of the reference pattern indicate each of the electrical signals at the input of the electrical signal selector generated in response to the optical input signal 11. Alternatively, the 1s or 0s of the reference pattern may indicate each of the electrical signals not generated in response to the optical input signal. The electrical signal selector excludes from the electrical signals fed to the summer 54 those of the electrical signals identified by the reference pattern, or the complement thereof.

In the embodiment described above, the electrical signals not generated in response to the optical input signal 11 are excluded from the electrical information signal 140 to generate the electrical information signal with a high signal-to-noise ratio. The signal-to-noise ratio of the electrical information signal is maximized when all of the electrical signals not generated in response to the optical input signal 11 are excluded, i.e., when the electrical information signal is generated from only the electrical signals generated in response to the optical input signal. These electrical signals are generated by the light detectors illuminated by the optical input signal.

The structure and operation of the information signal generator 118 may be simplified by structuring the information signal generator to generate the electrical information signal from the electrical signals generated by those of the light detectors located in a regular block that includes the light detectors illuminated by the optical input signal. The regular block is regular in terms of the addressing scheme used by the light detector array 16. The light detectors in the regular block will typically share address elements, and/or row or column busses, for example. Addressing intersecting rows and columns to address a regular block of the light detectors is simpler than individually addressing the light detectors located in a block having an arbitrary shape, such as the light detectors 30–34 shown in FIG. 2B.

The regular block will typically be square or rectangular. For example, the electrical information signal 140 may be generated from the electrical signals generated by the light detectors located in the square block composed of the light detectors 30–38 shown in FIG. 2B. This block includes the illuminated light detectors 30–34. However, some addressing schemes will result in the regular block having a shape that differs from square or rectangular.

Since it is likely that a regular block that includes the light detectors illuminated by the optical input signal 11 will additionally include some non-illuminated light detectors, e.g., the light detectors 35–38 in the example shown in FIG. 2B, the signal-to-noise ratio of the electrical information signal may be less than if the electrical signals generated by the non-illuminated light detectors in the block were excluded. However, the electrical information signal generated as just described will have a signal-to-noise ratio that is acceptable for many applications since the electrical signals generated by most of the non-illuminated light detectors in the light detector array 16, i.e., all of the light detectors located outside the regular block, are excluded.

Figure 3B:
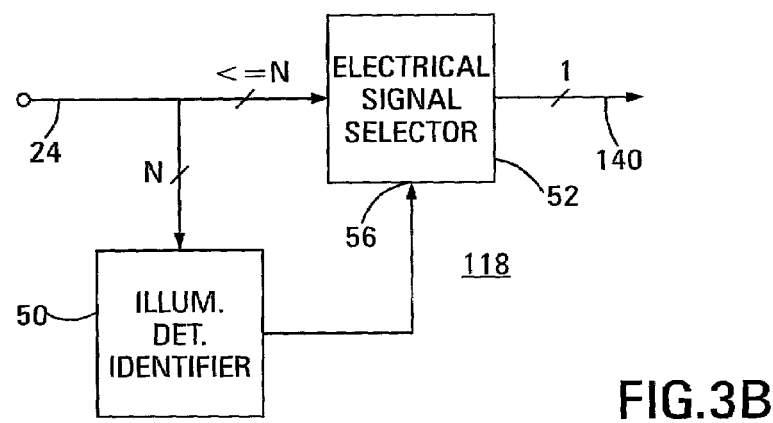
FIG. 3B is a block diagram of a second exemplary embodiment of the information signal generator of the optical receiver shown in FIGS. 2A–2D.

FIG. 3B is a block diagram showing a simplified example of a second embodiment of the information signal generator 118, which will be described with additional reference to FIG. 2A. This embodiment of the information signal generator identifies the electrical signals generated by the light detectors illuminated by the optical input signal and generates the electrical information signal by selecting one of the electrical signals identified generated in response to the optical input signal as the electrical information signal. Selecting one of the electrical signals identified generated in response to the optical input signal as the electrical information signal has the effect of eliminating from the electrical information signal ones of the electrical signals not generated in response to the optical input signal.

The electrical signal selector 52 has a signal input connected by the electrical connection 24 to the light detector array 16. The signal input of the electrical signal selector receives the electrical signals generated by the N light detectors, or a subset of them, via the electrical connection. The electrical signal selector additionally has a control input 56 through which it receives the identity information from the illuminated detector identifier 50.

In response to the identity information received from the illuminated detector identifier 50, the electrical signal selector 52 selects, as the electrical information signal 140, one of the electrical signals identified by the identity information as being generated in response to the optical input signal 11. When the identity information indicates that more than one of the electrical signals is generated in response to the optical information signal, the electrical signal selector may perform a geometrical calculation on the identity information to identify the electrical signal generated by one of the light detectors located at or near the center of the light detectors illuminated by the optical input signal. This determination is simplified when an identity code is used to convey the identity information, as described above. In this case, each identity code identifies the electrical signal generated by one of the light detectors located at or near the center of the light detectors illuminated by the optical input signal.

Alternatively, the illuminated detector identifier 50 may identify the one electrical signal and provide identity information identifying the one electrical signal to the electrical signal selector 52. The single electrical signal selector then selects the one electrical signal as the electrical information signal 140.

The illuminated detector identifier 50 may identify the one electrical signal by performing a geometrical calculation on locations of the light detectors generating the electrical signals identified as being generated in response to the optical input signal 11 to identify the light detector located at or near the center of the light detectors illuminated by the optical input signal. The identity information then identifies the electrical signal generated by this one light detector.

Alternatively, the illuminated detector identifier 50 may perform qualitative analyses on the electrical signals identified as being generated in response to the optical input signal to determine which of them has the highest quality. For example, the illuminated detector identifier may measure the signal-to-noise ratio of each of the electrical signals. As another example, the illuminated detector identifier may extract the information signal from each electrical signal and determine the quality of the "eye" of the information signal. The illuminated detector identifier then feeds the identity of the electrical signal having the best "eye" quality to the electrical signal selector 52 as the identity information.

Figure 4:
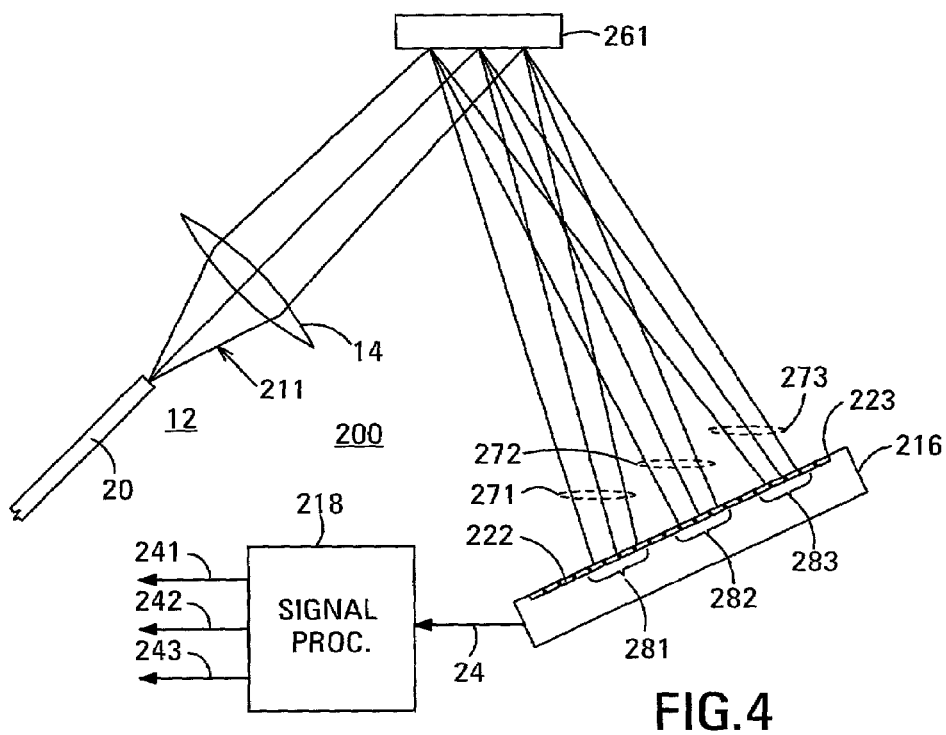
FIG. 4 is a schematic drawing of an example of a third embodiment of an optical receiver according to the invention.

FIG. 4 shows a third embodiment 200 of an optical receiver according to the invention. In this embodiment, the optical receiver 200 is a multi-channel optical receiver that receives the single, multi-frequency optical input signal 211 via the optical input path 12. The multi-frequency optical input signal is composed of p optical signal components, each having a different optical frequency. The optical receiver generates an electrical information signal in response to each of the optical signal components. In the example shown, p=3. The multi-frequency optical input signal may be a WDM optical signal, a DWDM optical signal or another kind of multi-frequency optical signal. Each of the optical signal components is modulated with a different information signal. Elements of the embodiment shown in FIG. 4 that correspond to elements of the embodiments shown in FIGS. 1A and 2A are indicated by the same reference numerals and will not be described in detail again.

The optical receiver 200 is composed of the optical input path 12, the optical converging element 14, the light detector array 216 and the information signal generator 218.

The optical receiver 200 is additionally composed of the frequency-dispersive device 261 arranged to receive the multi-frequency optical input signal 211 from the optical input path 12. In the example shown, a reflective diffraction grating is used as the frequency-dispersive device. A transmissive diffraction grating, a transmissive or reflective hologram or some other suitable device that spatially or angularly separates a multi-frequency optical input signal into its optical signal components in accordance with their optical frequencies may alternatively be used. The frequency-dispersive device 261 is shown as angularly separating the multi-frequency optical input signal into the optical signal components 271, 272 and 273 in accordance with their optical frequencies, and as reflecting the optical signal components towards the light detector array 216. The light detector array is located to receive the optical signal components output by the frequency-dispersive device.

The light detector array 216 is similar to the light-detector array 16 described above. However, the angular separation between the optical signal components makes a rectangular light detector array preferable over the substantially square light detector array shown in FIG. 2A. The light detector array has a light-sensitive surface 223 divided into light detectors, as described above. An exemplary light detector is shown at 222. The optical converging element 14 converges the multi-frequency optical input signal 211 so that the optical signal components 271, 272 and 273 form the spots 281, 282 and 283, respectively, on the light-sensitive surface. The angular separation of the optical signal components results in the spots being spatially separated from one another on the light-sensitive surface 223. Each of the spots is dimensioned to cover an area less than 1/p of the entire area of the light-sensitive surface, but preferably greater than that of one of the light detectors.

Each of the light detectors of the light detector array 216 individually and substantially independently generates an electrical signal in response to light falling on it. The electrical signal generated by each of the light detectors is coupled to the information signal generator 218 by the electrical connection 24 that extends from the light detector array to the information signal generator.

The information signal generator 218 receives the electrical signals from the light detector array 216 and generates from them the electrical information signals 241, 242 and 243. In generating each of the electrical information signals 241, 242 and 243, the information signal generator excludes ones of the electrical signals not generated in response to optical signal component 271, 272 or 273, respectively. For example, the electrical information signals 241, 242 and 243 may be generated in response to the electrical signals generated by only those of the light detectors illuminated by the optical signal components 271, 272 and 273, respectively. The information signal generator excludes the electrical signals generated by the light detectors not illuminated, or weakly illuminated, by the optical signal components 271, 272 and 273 from contributing to the respective electrical information signals to prevent noise included in such electrical signals from degrading the signal-to-noise ratio of the electrical information signals.

As noted above, the electrical signals excluded may be those generated by light detectors located outside a regular block that includes the light detectors illuminated by the respective optical signal component. However, the electrical information signals are generated with a maximum signal-to-noise ratio when the electrical signals excluded are those generated by the light detectors not illuminated by the respective optical signal component.

The information signal generator 218 may be based on the information signal generator 118 shown in FIG. 3A. In the information signal generator, the illuminated detector identifier identifies the light detectors illuminated by each of the p spots and generates identity information corresponding to each spot. The electrical signal selector selects the electrical signals generated by the light detectors illuminated by the respective optical signal component and feeds the selected electrical signals to a respective summer. This effectively excludes from each of the electrical information signals ones of the electrical signals not generated in response to the respective optical signal component. Each summer sums the electrical signals it receives from the electrical signal selector to generate a respective one of the information signals 241–243.

As in the embodiments shown in FIGS. 1A and 2A, the light detectors of the light detector array 216 that are illuminated by the optical signal components 271, 272 and 273 depend on the optical and physical characteristics of the components of the optical receiver 200 and on the alignments of the components. Since the information signal generator excludes the electrical signals generated by the light detectors not illuminated, or weakly illuminated, by the optical signal components 271, 272 and 273 from contributing to the respective electrical information signals 241, 242 and 243, it generates the information signals with a high signal-to-noise ratio and high bandwidth regardless of the locations of the spots 281, 282 and 283 on the light-sensitive surface 223.

As long as the optical receiver 200 is fabricated from components having optical and physical characteristics that lie within their respective tolerances and is assembled with the components aligned within their respective alignment tolerances such that the spots 281, 282 and 283 are located in spatially-separated regions of the light-sensitive surface 223, the optical receiver will generate the electrical information signals 241, 242 and 243 with signal-to-noise ratios comparable with that of the electrical information signals generated when the components have characteristics that lie at the centers of their respective tolerances and that are assembled with alignments that lie at the centers of their respective alignment tolerances. The invention therefore allows the optical receiver 200 to be made more simply and less expensively using wider-tolerance components assembled with wider positional- and orientation-tolerances than a conventional optical receiver.

In applications in which obtaining a maximum signal-to-noise ratio is less important, the illuminated detector identifier of the information signal generator 218 can operate simply by dividing the light-sensitive surface of the light detector array into p non-overlapping rectangular regions, each of which is illuminated by one and only one of the spots. For example, in the embodiment shown in FIG. 4, the light-sensitive surface 223 would be divided into three rectangular regions, each of which is illuminated by one of the optical signal components 271, 272 and 273. Each of the electrical information signals 241, 242 and 243 is then generated by summing the electrical signals generated by substantially all of the light detectors in a respective one of the rectangular regions in a manner similar to the way in which the information signal 40 is generated by summing the electrical signals generated by substantially all of the light detectors of the light detector array 16.

The embodiment of the information signal generator 118 shown in FIG. 3B may also be modified for use as the information signal generator 218. In this case, the information signal generator 218 identifies the electrical signals generated by the light detectors illuminated by each of the optical signal components 271, 272 and 273 and generates the electrical information signals 241, 242 and 243 by selecting the electrical signal generated by one of the light detectors illuminated by each of the optical signal components 271, 272 and 273, respectively.

In the embodiments shown in FIGS. 1A, 2A and 4, the light detectors of the light detector array 16 and 216 are shown connected to the information signal generator by the electrical connection 24. Each light detector may be connected to the information signal generator by an individual electrical conductor that forms part of the electrical connection 24. Alternatively, the area occupied by the electrical connection 24 may be reduced by including in the light detector array circuitry that obtains samples of the electrical signal generated by each of the light detectors, time multiplexes the samples and feeds the samples to the information signal generator via the electrical connection 24. In this case, each light detector is connected to the information signal generator by a different temporal element of the electrical connection 24. CCD and CMOS light detector arrays with such signal sampling and multiplexing capabilities are commercially available.

As a further alternative, each row of light detectors in the light detector arrays 16 and 216 may include circuitry that samples the electrical signal generated by each of the light detectors in the row, time multiplexes the samples and feeds the samples to the information signal generator via a corresponding conductor that forms part of the electrical connection 24. The sampling just described may be applied to the columns of the light detector array instead of to the rows.

When the electrical signals generated by the light detectors of the light detector array 16 or 216 are sampled and multiplexed as just described, the information signal generator 18, 118 or 218 additionally includes one or more demultiplexers to recover the electrical signals generated by the individual light detectors from the time-multiplexed samples.

When samples of the electrical signals generated by the light detectors of the light detector array 16 or 216 are fed to the information signal generator 18, 118 or 218, the sampling frequency at which the electrical signals are sampled may limit the maximum frequency of the electrical information signal that can be recovered from the optical input signal 11. To increase the maximum frequency of the electrical information signal that can be recovered for a given sampling frequency, the light detector array may be configured to operate in two different sampling modes.

FIGS. 5A–5G show part of a fourth embodiment 300 of an optical receiver according to the invention. In this embodiment, the light detector array operates in two different sampling modes. The optical arrangement of the optical receiver 300 is similar to that of the optical receiver 10 shown in FIG. 1A. Consequently, the optical input path, the converging element and the optical input signal are omitted to simplify the drawings. The drawings show the light detector array 316 and the spot 326 formed by the optical input signal on the light-sensitive surface 323. The example shown is for receiving a single-frequency optical input signal. The embodiment of the optical receiver shown in FIG. 4 for receiving a multi-frequency optical input signal that includes multiple optical frequency components can be similarly modified. Elements of the optical receiver 300 that correspond to elements of the optical receivers 10 and 100 shown in FIGS. 1A, 2A and 3A are indicated using the same reference numerals and will not be described again here.

The information signal generator 318 is composed of the illuminated detector identifier 350 and the summer 354. The light detector array 316, in its selective sampling mode, to be described in detail below, receives the identity information ID generated by the illuminated detector identifier and performs the function of the electrical signal selector 52 of the information signal generator 118 shown in FIG. 3A.

Figure 5A:
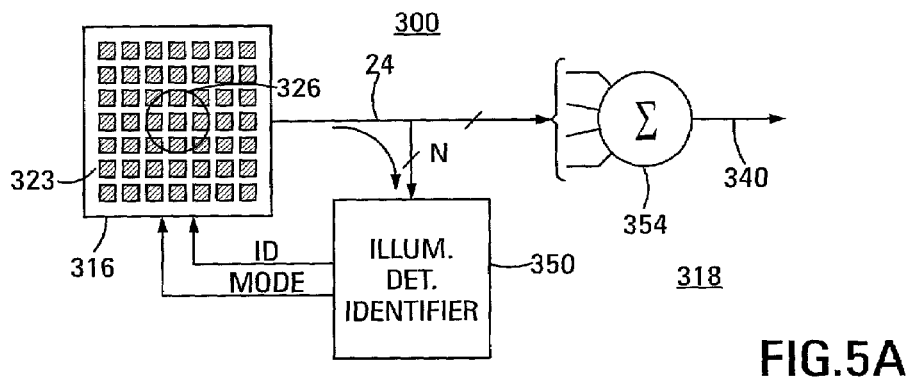
FIG. 5A is a schematic drawing showing part of an example of a fourth embodiment of an optical receiver according to the invention operating in its general sampling mode.
Figure 5B:
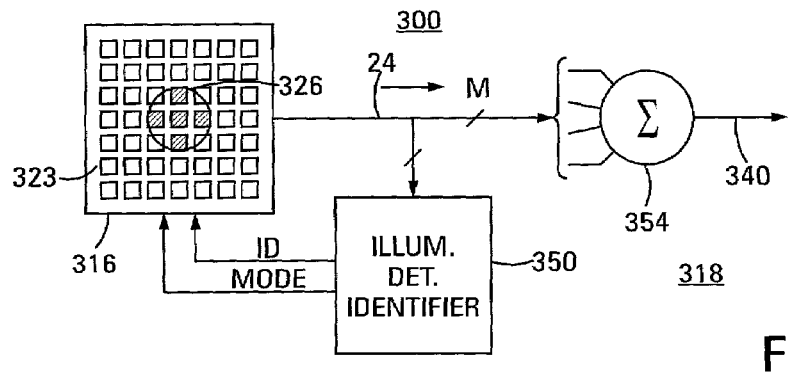
FIG. 5B is a schematic drawing showing part of the example of the fourth embodiment of an optical receiver according to the invention operating in its selective sampling mode.

In the optical receiver 300, the light detector array 316 operates in response to the mode control signal MODE and the identity information ID generated by the illuminated detector identifier 350. During an initial set-up procedure that is performed at least when the optical receiver is first installed, the mode control signal sets the light detector array to its general sampling mode. In its general sampling mode, the light detector array samples the electrical signals generated by more of its light detectors than in its selective sampling mode to enable the light detectors illuminated by the optical input signal 11 to be identified. For example, the light detector array may sample the electrical signals generated by all of the light detectors, as shown in FIG. 5A. In FIG. 5A, the electrical signals generated by those of the light detectors indicated by shading are sampled. The light detector array feeds the samples to the information signal generator 318.

In the information signal generator 318, the illuminated detector identifier 350 receives the samples and from them identifies the light detectors illuminated by the optical input signal 11. The illuminated detector identifier generates the identity information that indicates the locations of the illuminated light detectors in the light detector array 316.

The illuminated detector identifier 350 changes the state of the mode control signal MODE and additionally feeds the identity information ID to the light detector array 316. In response to the changed state of the mode control signal, the light detector array changes to its selective sampling mode. In its selective sampling mode, the light detector array samples the electrical signals generated by the light detectors identified by the identity information, as indicated by shading in FIG. 5B. This effectively excludes from the electrical information signal 340 the electrical signals generated by ones of the light detectors not illuminated by the optical input signal. The light detector array multiplexes the samples and feeds them to the information signal generator 118.

In the information signal generator 318, the summer 354 demultiplexes and sums the samples of the electrical signals to generate the electrical information signal 340.

When operating in its selective sampling mode, the light detector array 316 reduces the time intervals between successive samples of each of the electrical signals generated by the illuminated light detectors. This increases the maximum frequency of the electrical information signal that can be generated for a given sampling frequency.

Figure 5C:
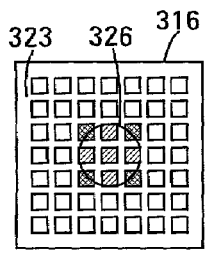
FIG. 5C is a view of the light sensitive surface of the light detector array of the optical receiver shown in FIG. 5B.

Operation of the light detector array 316 in its selective sampling mode can be simplified by sampling the electrical signals generated by the light detectors in a regular block that includes the light detectors illuminated by the optical input signal 11. FIG. 5C shows an example of such a regular block of light detectors. The regular block includes the light detectors shown in FIG. 5B that are illuminated by the optical input signal. The regular block also includes the additional light detectors indicated by crosshatch shading. When the light detector array 316 samples the electrical signals generated by the light detectors in the regular block, the identity information fed to the light detector array identifies the light detectors constituting the regular block. Although more light detectors are identified, the sampling process is simplified by sampling the electrical signals generated by a regular block of light detectors, in contrast to the irregular arrangement of light detectors shown in FIG. 5B.

Figure 5E:
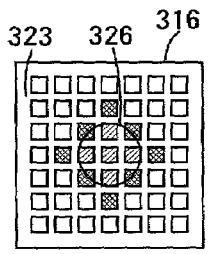
FIGS. 5E, 5F and 5G are views of the light sensitive surface of the light detector array of the optical receiver shown in FIG. 5B.
Figure 5F:
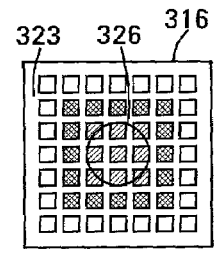
Figure 5G:
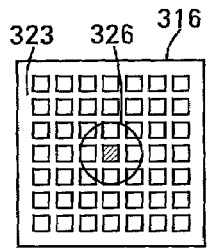
Figure 5D:
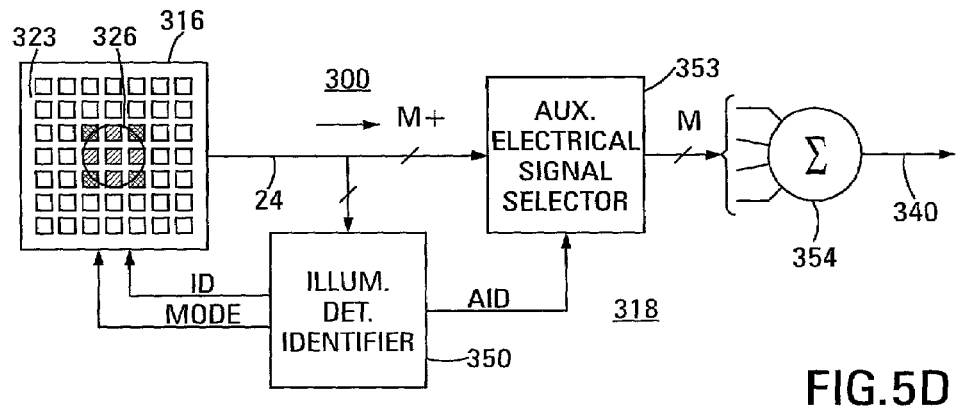
FIG. 5D is a schematic drawing showing part of another example of the fourth embodiment of an optical receiver according to the invention that additionally includes an auxiliary electrical signal selector.

If the signal-to-noise ratio of the electrical information signal 340 generated by the information signal generator 318 from the electrical signals generated by a regular block of light detectors is too low, it may be increased by including the auxiliary electrical signal selector 353 in the information signal generator 318, as shown in FIG. 5D. The additional electrical signal selector receives the samples of the electrical signals generated by the light detector array 316 and additionally receives the auxiliary identity information AID generated by the illuminated detector identifier 350. The auxiliary identity information identifies the electrical signal samples output by the light detector array 316 that are not generated in response to the optical input signal 11.

The auxiliary electrical signal selector 353 operates in response to the auxiliary identity information received from the illuminated detector identifier 350 to exclude, from the samples received from the light detector array 316, those of the samples generated by the light detectors not illuminated by the optical input signal 11. The additional electrical signal selector demultiplexes the remaining samples and feeds them to the summer 354. Thus, the summer generates the electrical information signal 340 from the electrical signals generated only by those of the light detectors that are illuminated by the optical input signal.

During operation of the optical receiver 300, temperature and other changes may change either or both of the location and size of the spot 326 on the light-sensitive surface 323. Such changes in the spot may be sufficient to change the identity of the light detectors illuminated by the optical input signal 11. To track such changes in the spot, the light detector array 316, when operating in its selective sampling mode, may additionally sample the electrical signals generated by a number of the light detectors surrounding the light detectors identified as being illuminated by the optical input signal. For example, the light detector array 316 may additionally sample the electrical signals generated by the light detectors indicated by crosshatch shading in FIG. 5E. These light detectors surround the light detectors (indicated by diagonal shading) whose electrical signals are sampled in the example shown in FIG. 5B.

The samples of the electrical signals generated by all of the light detectors sampled by the light detector array 316 in its selective sampling mode are fed to the illuminated detector identifier 350. Using these samples, the illuminated detector identifier determines when the identity of the illuminated light detectors changes. When such a change occurs, the illuminated detector identifier generates new identity information that it feeds to the light detector array. The new identity information causes the light detector array to make a corresponding change in the light detectors whose electrical signals are sampled in the selective sampling mode.

When the light detector array 316 samples the electrical signals generated by a regular block of light detectors that includes the light detectors illuminated by the optical input signal 11, as shown in FIG. 5C, the light detector array may additionally sample the electrical signals generated by the light detectors that surround the regular block, as shown in FIG. 5F. This enables the illuminated detector identifier 350 to track changes in the identity of the illuminated light detectors as the size and location of the spot changes. For example, the light detector array 316 may additionally sample the electrical signals generated by the light detectors indicated by crosshatch shading in FIG. 5B. These light detectors surround the light detectors (indicated by diagonal shading) whose electrical signals are sampled in the example shown in FIG. 5C.

The electrical signals generated by the light detectors surrounding the regular block of light detectors contribute to the electrical information signal 340. If this unacceptably degrades the signal-to-noise ratio of the electrical information signal, the information signal generator 318 may include the above-described auxiliary electrical signal selector 353 to exclude from the electrical information signal the electrical signals generated by the light detectors not illuminated by the optical input signal. The electrical information signal is then generated from only the electrical signals generated by the light detectors illuminated by the optical input signal.

The optical receiver 300 may alternatively adjust to changes in the size or position of the spot 326 on the light sensitive surface 323 of the light detector array 316 simply by occasionally and momentarily switching the light detector array to its general sampling mode.

Finally, the light detector array 316 may operate in its selective sampling mode to deliver samples of the electrical signal generated by one of the light detectors identified as generating an electrical signal in response to the optical input signal. The one of the light detectors is indicated by shading in FIG. 5G. The information signal generator 318 generates the electrical information signal 340 from the samples of the electrical signal. In this case, the summer 354 is omitted, and the electrical information signal is generated from the samples of the one electrical signal. The illuminated detector identifier may operate as described above with reference to FIG. 3B to identify the one light detector.

Figure 6:
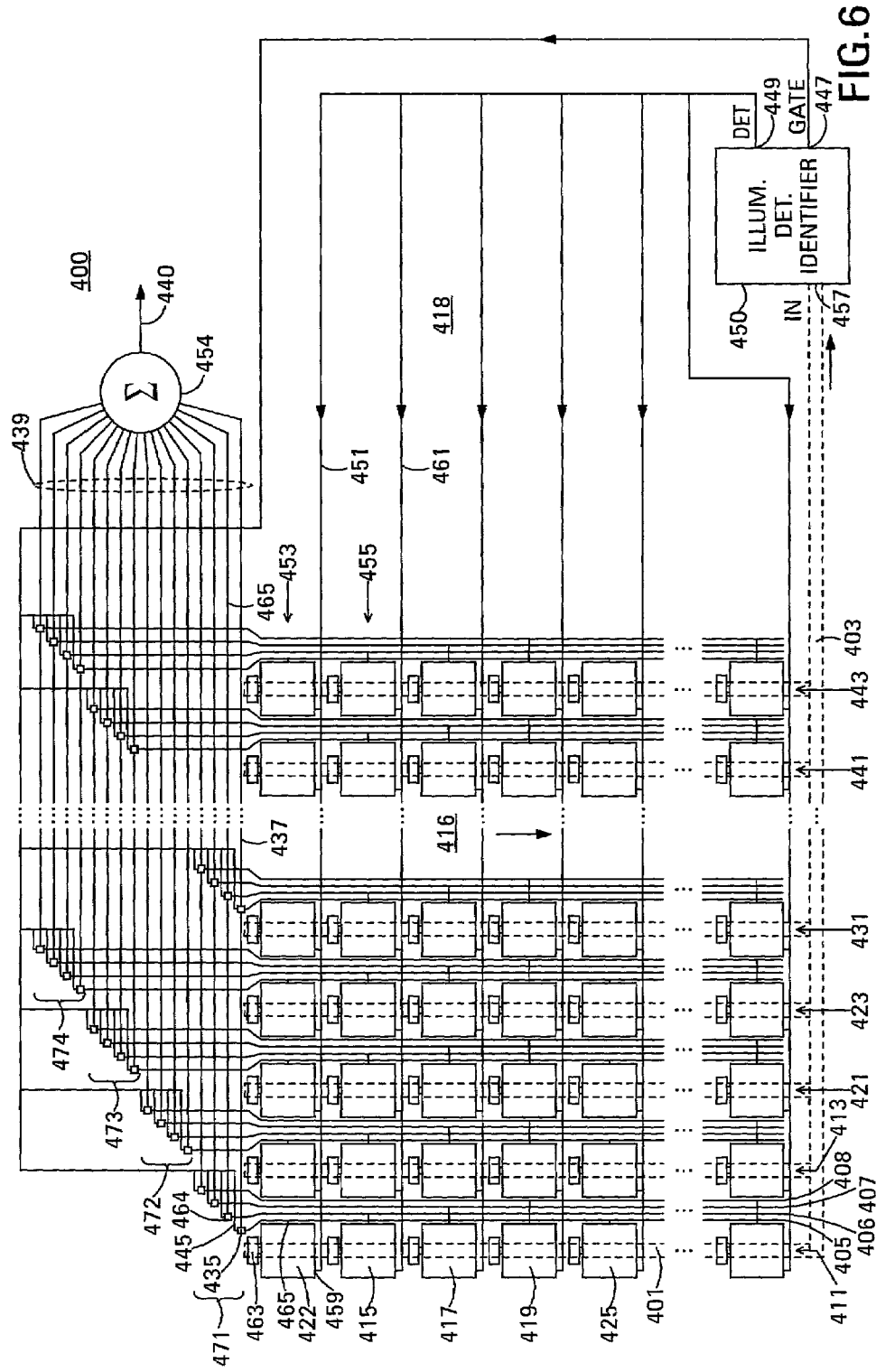
FIG. 6 is a schematic drawing showing part of an example of a fifth embodiment of an optical receiver according to the invention.

FIG. 6 shows part of a fifth embodiment 400 of the optical receiver that operates in a hybrid mode in which the illuminated light detectors are identified using samples of the electrical signals generated by the light detectors, and the information signal is generated by summing the electrical signals generated by the illuminated light detectors. As in the embodiment shown in FIGS. 5A and 5B, the light detector array performs part of the function of the information signal generator, namely, that of the electrical signal selector.

The optical arrangement of the optical receiver 400 is similar to that of the optical receiver 10 shown in FIG. 1A. Consequently, the optical input path, the converging element and the optical input signal are omitted to simplify the drawing. The drawing shows part of the light detector array 416 and the information signal generator 418. The example shown is for receiving a single-frequency optical input signal. The embodiment of the optical receiver shown in FIG. 4 for receiving an optical input signal that includes multiple optical frequencies can be similarly modified.

In the optical receiver 400, the light detector array 416 is composed of a two-dimensional array of light detectors arranged in rows and columns. An exemplary light detector is shown at 422. Each light detector generates an electrical signal in response to light falling on it. Most of the light detectors of the light detector array are omitted from FIG. 6 to simplify the drawing.

A charge coupling channel underlies each column of the light detectors. For example, the charge coupling channel 401 underlies the column 411 in which the light detector 422 is located. Each of the light detectors in the column has a charge output connected to the underlying charge coupling channel. The charge output of the light detector 422 is shown at 463.

The charge coupling channels of all the columns are connected to the output coupling channel 403. The output of the output coupling channel is connected to the electrical signal input 457 of the illuminated detector identifier 450.

Column busses are interposed between adjacent columns of the light detectors. Each of the light detectors in the column has an electrical signal output connected to one of the column busses. The example shown in FIG. 6 is one in which the electrical information signal 440 is generated from the light detectors located in a region of the light sensor array 416 having an extent of less than 4×4 light detectors. In this example, four column busses are interposed between adjacent columns, and each of four adjacent light detectors in one of the columns adjacent the column busses is connected to a different one of the column busses. In this example, the column busses 405, 406, 407 and 408 are interposed between the columns 411 and 413, and, in column 411, the signal output 465 of light detector 422 is connected to the column bus 405, the signal output of light detector 415 is connected to the column bus 406, the signal output of light detector 417 is connected to the column bus 407 and the signal output of light detector 419 is connected to the column bus 408. The signal output of light detector 425 next to the light detector 419 is connected to the column bus 405. For brevity, the column busses to which the light detectors in column x are connected will be said to be the column busses of column x.

Each column bus is connected via a gate to one of the 16 output busses 439. For example, the column bus 405 is connected via the gate 435 to the output bus 437, which is one of the output busses 439. Each of the column busses 405–408 is connected via a respective gate to a respective one of the group 471 of four of the output busses 439. Each of the column busses of column 413 is connected via a respective gate to a respective one of the group 472 of four of the output busses 439. Each of the column busses of column 421 is connected via a respective gate to a respective one of the group 473 of four of the output busses 439. Each of the column busses of column 423 is connected via a respective gate to a respective one of the group 474 of four of the output busses 439. The 16 output busses 439 are connected to inputs of the summer 454. The summer 454 sums the electrical signals received via the output busses 439 to generate the information signal 440.

Also shown in FIG. 6 are the four column busses of column 431. Each of the column busses of column 431 is connected via a respective gate to a respective one of the group 471 of four of the output busses 439, i.e., to the same group of four of the output busses as the columns busses of column 411 are connected. The four column busses (not shown) of the columns from column 431 through column 443, some of which are not shown, are connected via respective gates to the respective groups 471–474 of four of the output busses 439 in a manner similar to the column busses of columns 411, 413, 421 and 423.

Each gate between one of column busses and one of the output busses has a control input to which a gate control line is connected. For example, gate control line 445 is connected to the control input of the gate 435 between the column bus 405 and the output bus 437. The gate control lines are connected to the gate control output 447 of the illuminated detector identifier 450. This can be done by a suitable multiplexing arrangement (not shown). The illuminated detector identifier feeds a gate control signal individually addressed to each of the gates connected to the output busses 439 via the gate control output. The state of the gate control signal determines whether or not the gate to which it is addressed connects the column bus to the output bus.

Detector control lines are located between adjacent rows of the light detectors of the light detector array 416. For example, the detector control line 451 is located between rows 453 and 455. The control inputs of the light detectors in each row are connected to the detector control line of the row. For example, the control input 459 of the light detector 422 and the control inputs of the remaining light detectors in row 453 are all connected to the detector control line 451. The detector control lines are all connected to the detector control output 449 of the illuminated detector identifier 450.

The detector control line of a row carries a detector control signal individually addressed to each of the light detectors in the row. The state of the detector control signal determines whether the light detector feeds a sample of the electrical signal it generates to the underlying charge coupling channel, or if the light detector feeds the electrical signal to the adjacent column bus. For example, the state of the detector control signal addressed to the light detector 422 on the detector control line 451 determines whether the light detector 422 feeds a sample of the electrical signal it generates to the illuminated detector identifier 450 via the charge coupling channels 401 and 403 or if the light detector feeds the electrical signal to the summer 454 via the column bus 405, the gate 435 and the output bus 437.

Initially, the illuminated detector identifier 450 sets the detector control signals addressed to all of the light detectors to the state that causes each light detector to feed a sample of the electrical signal it generates to its respective charge coupling channel. The resulting samples are transferred via the charge coupling channels and the output channel 403 to the input of the illuminated detector identifier. The illuminated detector identifier receives the samples from all the light detectors of the light detector array 416 and uses the samples to identify the light detectors that are illuminated by the optical input signal 11 (FIG. 2A). For example, the illuminated detector identifier may determine whether the amount of charge in the sample received from each light detector is greater than or less than a predetermined threshold value. The illuminated detector identifier may accumulate several samples from each light detector in the course of determining whether or not the light detector is illuminated.

The illuminated detector identifier 450 then changes the state of the detector control signals fed via the detector control lines to those of the light detectors that have been identified as being illuminated by the optical input signal 11. The changed state of the control signals causes the respective light detectors to feed the electrical signal each generates to the column busses to which they are connected. In addition, the illuminated detector identifier generates gate control signals that it feeds via the gate control output 447 and the gate control lines to open the gates connected to the column busses that are connected to those of the light detectors identified as the illuminated light detectors.

Consider an example in which the light detectors 422 and 415 are identified as the illuminated light detectors. The illuminated detector identifier 450 changes the detector control signals fed to the light detectors 422 and 415 via the detector control lines 451 and 461, respectively, to cause these light detectors to feed the electrical signals they generate to the column busses 405 and 406, respectively. In addition, the illuminated detector identifier generates gate control signals that it feeds via its gate control output 447 and the gate control lines to the gates 435 and 464. The gate control signals cause the gates 435 and 464 to connect the column busses 405 and 406 to the output busses 437 and 465, respectively. The column bus 405, the gate 435 and the output bus 437 collectively provide a first configurable, substantially static signal path between the signal output of the light detector 422 and an input of the summer 454. Similarly, the column bus 405, the gate 464 and the output bus 465 provides a second configurable, substantially static signal paths between the signal output of the light detector 415 and an input of the summer 454. The summer generates the information signal 440 from the electrical signals generated by the light detectors 422 and 415.

Typically, the optical input signal 11 (FIG. 2A) will illuminate more of the light detectors than the light detectors 422 and 415 just described. In this case, for each light detector that the illuminated detector identifier 450 identifies as an illuminated light detector, the illuminated detector identifier generates a detector control signal that causes the illuminated light detector to connect its electrical signal output to its respective column bus. The illuminated detector identifier additionally generates a gate control signal that causes the gate connected to the column bus to connect the column bus to the respective one of the output busses 439. This establishes a substantially static signal path that connects the electrical signal generated by the illuminated light detector to one of the inputs of the summer 454.

It will be apparent to a person of ordinary skill in the art that the above-described arrangement of light detectors with switchable signal outputs, column busses, gates and output busses enables non-sampling, substantially static signal paths to be configured. Each configurable, substantially static signal path connects the signal output of one of the light detectors and to an input of the summer 454. In the example shown in FIG. 6, up to 16 configurable, substantially static signal paths can be established. The maximum number of configurable, substantially static signal paths can be changed by changing the numbers of column busses per column, the number of gates and the number of output busses.

The configurable, substantially static signal paths are substantially static in two senses. First, once the signal paths are configured as described above, the signal paths change only when the position or size of the spot on the light-sensitive surface changes to the extent that the identity of the illuminated light detectors changes.

Second, the signal paths are non-sampling signal paths and therefore impose less severe limitations on the bandwidth of the electrical information signal 440 than a sampling signal connection. Moreover, the bandwidth of the electrical information signal does not depend on the sampling rate used to generate the samples fed to the illuminated detector identifier 450. Accordingly, a relatively slow sampling rate can be used, which can simplify the design and operation of the light detector array 416.

The light detector array 416 can continue to generate samples of the electrical signals generated by each of its light detectors after the substantially static connections between the illuminated light detectors and the inputs of the summer 454 have been configured. This enables the optical receiver 400 to track changes in the position or size of the spot on the light sensitive surface of the light detector array 416. The illuminated light detectors whose electrical signals are connected to the input of the summer 454 do not contribute samples to their respective charge coupling channels. As a result, the illuminated detector identifier is not able to determine directly whether these light detectors continue to be illuminated light detectors. Instead, the illuminated detector identifier detects increases in the illumination level of the non-illuminated light detectors surrounding the illuminated light detectors.

When the illuminated detector identifier 450 detects a pattern of newly-illuminated light detectors consistent with a change in the position or size of the spot on the light-sensitive surface of the light detector array, it changes the detector control signals output at its detector control output 449 and the gate control signals output at its gate control output 447. This reconfigures the substantially static signal paths to connect the signal outputs of the newly-illuminated light detectors to the inputs of the summer 454. This reconfiguration additionally disconnects the signal outputs of the light detectors that are no longer illuminated from the inputs of the summer.

The above-described arrangement of light detectors with switchable signal outputs, column busses, gates and output busses for providing configurable, substantially static signal paths between the light detectors identified as illuminated light detectors and the inputs of the summer 454 is an exemplary arrangement. Other arrangements that provide such configurable, substantially static signal paths will be apparent to the person of ordinary skill in the art and may be used instead of the arrangement described.

The light detector array 416 feeds to the summer 454 the electrical signals generated by the light detectors identified as illuminated light detectors. This effectively excludes from the electrical information signal 440 the electrical signals generated by ones of the light detectors not illuminated is by the optical input signal. For example, the light detectors identified as the illuminated light detectors may be those that are actually illuminated by the optical input signal 11. In this case, the information signal 440 is generated exclusively from the electrical signals generated by the light detectors illuminated by the optical input signal.

Operation of the light detector array 416 can be simplified by configuring the substantially static signal paths to connect to the summer 454 the light detectors located in a regular block that includes the light detectors illuminated by the optical input signal 11. An example of such regular block is described above with reference to FIG. 5C.

Since it is likely that the regular block will include some non- or weakly-illuminated light detectors, the signal-to-noise ratio of the electrical information signal 440 may be less than it would be if the electrical signals from the non- or weakly-illuminated light detectors were excluded. Nevertheless, the signal-to-noise ratio of the electrical information signal generated using such simplified connection scheme may be acceptable in many applications. The signal-to-noise ratio of the information signal may be improved by including an auxiliary electrical signal selector in the information signal generator 418. An arrangement similar to that shown in FIG. 5D can be used, for example.

The embodiment 400 of the optical receiver shown in FIG. 6 can be modified to generate an information signal in response to each of multiple optical signal components included in the optical input signal, as in the multi-channel optical receiver shown in FIG. 4.

The embodiment 400 of the optical receiver shown in FIG. 6 can be modified to select, as the electrical information signal 440, the electrical signal generated by one of the light detectors identified as illuminated by the optical input signal. In this case, the optical receiver 400 includes only one configurable, substantially static signal path and the summer 454 is not required. The configurable, substantially static signal path is composed of one column bus per column of the light detectors, only one output bus and one gate between each column bus and the output bus. The configurable, substantially static signal path is configured to receive the electrical signal from one of the light detectors identified as being illuminated by the optical input signal. The electrical signal is output by the configurable, substantially static signal path as the electrical information signal 440.

In the descriptions of several of the embodiments described above, the information signal generator is described as summing the electrical signals generated by the light detector array, or selected ones of these signals, to generate the electrical information signal. The information signal generator may otherwise process the electrical signals in addition to summing them. For example, the information signal may reconstitute the electrical signals from the samples of the electrical signals received from the light detector array when the latter operates in a sampling mode. As another example, the information signal generator may additionally apply temporal de-skewing to the electrical signals it receives from the light detector array to compensate for any mismatch in the path lengths between the light detectors of the detector array and the information signal generator. The information signal generator may also amplify the electrical signals.

Figure 7A:
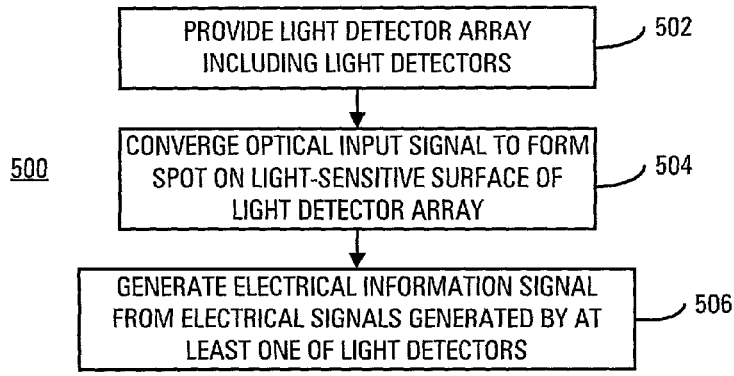
FIG. 7A is a flow chart showing an example of a method according to the invention for receiving an optical input signal.

FIG. 7A illustrates a method 500 according to the invention of generating an electrical information signal from an optical input signal modulated with an information signal.

In process 502, a light detector array including light detectors is provided. The light detectors each generate an electrical signal in response to light.

In process 504, the optical input signal is optically converged to form a spot on the light-sensitive surface of the light detector array. The spot has an area less than the area of the light-sensitive surface but greater than the area of one of the light detectors.

In process 506, the electrical information signal is generated from at least one of the electrical signals generated by the light detectors.

Figure 7B:
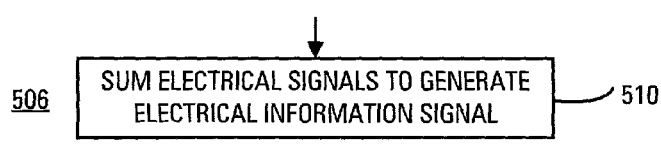
FIG. 7B is a flow chart showing a first exemplary embodiment of process 506 of the method shown in FIG. 7A.

FIG. 7B illustrates a first exemplary embodiment of process 506 of the method illustrated in FIG. 7A.

In process 510, the electrical information signal is generated by summing the electrical signals generated by the light detectors.

Figure 7C:
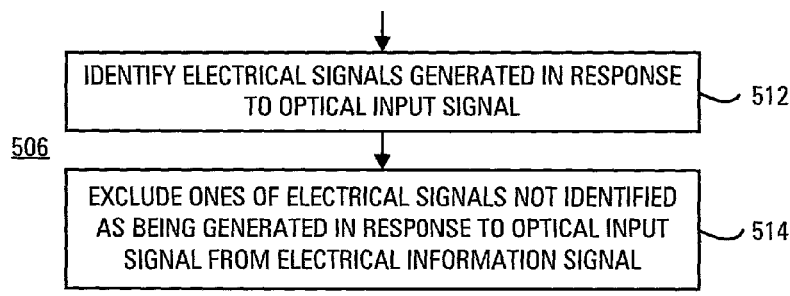
FIG. 7C is a flow chart showing a second exemplary embodiment of process 506 of the method shown in FIG. 7A.

FIG. 7C illustrates a second exemplary embodiment of process 506 of the method illustrated in FIG. 7A.

In process 512, the electrical signals generated in response to the optical input signal are identified.

In process 514, ones of the electrical signals not identified as being generated in response to the optical input signal are excluded from the electrical information signal.

The electrical signals identified as generated in response to the optical input signal are generated by respective illuminated light detectors. In an embodiment of process 512, the electrical signals generated by ones of the light detectors surrounding the illuminated light detectors, as illustrated in FIG. 5E, are not excluded. In another embodiment of process 512, the electrical signals generated by ones of the light detectors located in a regular block that includes the illuminated light detectors, as illustrated in FIG. 5C, are not excluded. In a third embodiment of process 512, the electrical signals generated by ones of the light detectors surrounding the regular block, as illustrated in FIG. 5F, are also not excluded.

The optical input signal may be subject to mode scrambling to provide a uniform spatial distribution of energy in the spot.

Figure 7D:
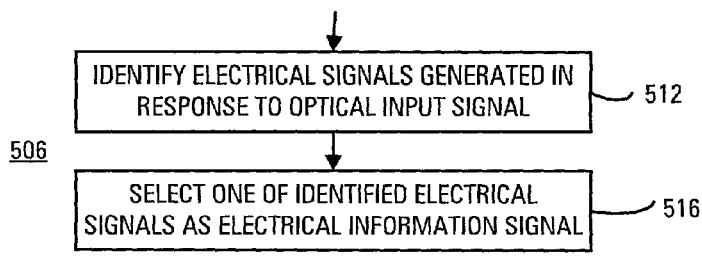
FIG. 7D is a flow chart showing a third exemplary embodiment of process 506 of the method shown in FIG. 7A.

FIG. 7D illustrates a third exemplary embodiment of process 506 of the method illustrated in FIG. 7A.

In process 512, the electrical signals generated in response to the optical input signal are identified, as described above.

In process 516, one of the electrical signals identified in process 512 as being generated in response to the optical input signal is selected as the electrical information signal.

Figure 7E:
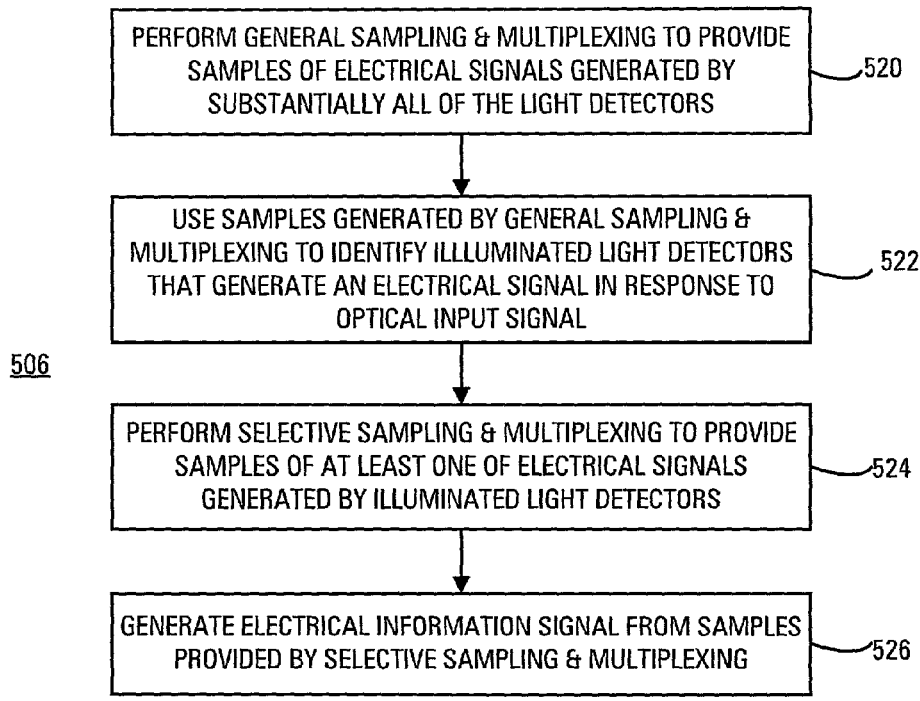
FIG. 7E is a flow chart showing a fourth exemplary embodiment of process 506 of the method shown in FIG. 7A.
Figure 7F:
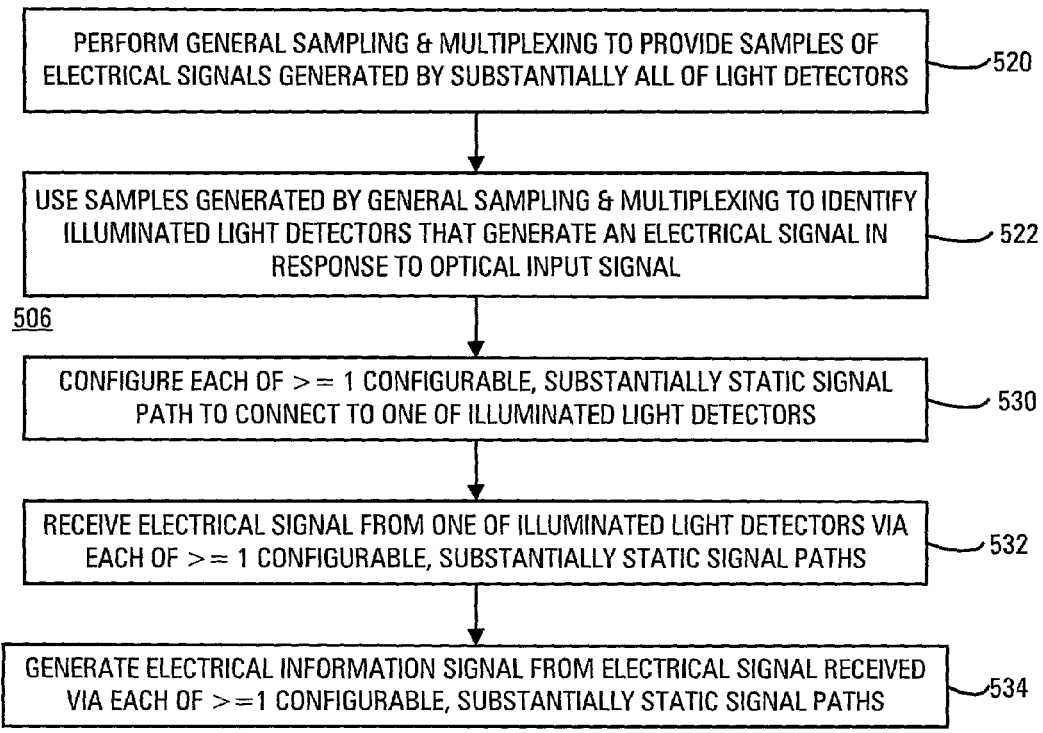
FIG. 7F is a flow chart showing a fifth exemplary embodiment of process 506 of the method shown in FIG. 7A.

FIGS. 7E and 7F illustrate two further exemplary embodiments of process 506 of the method illustrated in FIG. 7A. These embodiments include sampling and multiplexing the electrical signals generated by the light detectors.

Both embodiments include processes 520 and 522 that employ sampling and multiplexing to identify the light detectors illuminated by the optical input signal.

In process 520, general sampling and multiplexing is performed to provide samples of the electrical signals generated by substantially all of the light detectors, as shown in FIG. 5A.

In process 522, the samples provided by the general sampling and multiplexing are used to identify illuminated light detectors that generate an electrical signal in response to the optical input signal.

The embodiment shown in FIG. 7E additionally includes processes 524 and 526.

In process 524, selective sampling and multiplexing is performed to provide samples of at least one of the electrical signals generated by the light detectors identified in process 522.

In process 526, the electrical information signal is generated from the samples provided by the selective sampling and multiplexing.

The selective sampling and multiplexing may additionally provide samples of the electrical signals generated by those of the light detectors, surrounding the illuminated light detectors, as illustrated in FIG. 5E. Alternatively, the selective sampling and multiplexing may additionally provide samples of the electrical signals generated by the light detectors located in a regular block that includes the illuminate light detectors, as illustrated in FIG. 5C, and may also provide samples of the electrical signals generated by the light detectors surrounding such regular block, as illustrated in FIG. 5F When the selective sampling and multiplexing provides samples generated by light detectors in addition to the illuminated light detectors, as just described, the method may additionally exclude from the samples from which the electrical information signal is generated the samples generated by the light detectors that are not the illuminated light detectors.

As a further alternative, the selective sampling and multiplexing may provide samples of the electrical signal generated by only one of the illuminated light detectors, as shown in FIG. 5G. The electrical information signal is then generated from the samples of the one electrical information signal.

The embodiment shown in FIG. 7F additionally includes processes 530, 532 and 534.

In process 530, each of at least one configurable, substantially static signal path is configured to connect to one of the illuminated light detectors identified in process 522.

In process 532, the electrical signal from one of the illuminated light detectors is received via each of the at least one configurable, substantially static signal path.

In process 534, the electrical information signal is generated from the electrical signal received via each of the at least one configurable, substantially static signal path.

In process 532, the configurable, substantially static signal paths may alternatively be configured to connect to ones of the light detectors surrounding the illuminated light detectors. Alternatively, the configurable, substantially static signal paths may be configured to connect to ones of the light detectors located in a regular block that includes the illuminated light detectors, and may also be configured to connect to light detectors surrounding such regular block.

The method may additionally exclude the electrical signals generated by light detectors that are not the illuminated light detectors from the electrical signals from which the electrical information signal is generated.

Alternatively, in process 530, a configurable, substantially static signal path may be configured to connect to one of the illuminated light detectors identified in process 522. In process 532, the electrical signal is received from the illuminated light detector via the configurable, substantially static signal path. In process 534, the electrical signal received via the configurable, substantially static signal path is output as the electrical information signal.

Although this disclosure describes illustrative embodiments of the invention in detail, it is to be understood that the invention is not limited to the precise embodiments described, and that various modifications may be practiced within the scope of the invention defined by the appended claims.

We claim:

1. An optical receiver, comprising:
   an optical input path;
   a light detector array, including:
      a light-sensitive surface having an area, and
      light detectors each having an area and generating an electrical signal in response to light;
   an optical converging element located to focus an optical input signal received via the optical input path to form a spot on the light-sensitive surface of the light detector array, the spot having an area less than the area of the light-sensitive surface but greater than the area of one of the light detectors; and
   an information signal generator that generates an electrical information signal from at least one of the electrical signals, the information signal generator operable to:
      identify the electrical signals generated in response to the optical input signal, the electrical signals identified as being generated in response to the optical input signal being generated by respective illuminated light detectors,
      generate the electrical information signal from the electrical signals,
      exclude from the electrical information signal ones of the electrical signals not identified as being generated in response to the optical input signal, and
      not exclude from the electrical information signal the electrical signals generated by at least one of:
         ones of the light detectors surrounding the illuminated light detectors;
         ones of the light detectors located in a regular block that includes the illuminated light detectors, the block being regular in terms of an addressing scheme of the light detector array; and
         ones of the light detectors surrounding the regular block that includes the illuminated light detectors.

2. The optical receiver of claim 1, in which the information signal generator includes a summer that sums the electrical signals generated by the light detectors to generate the electrical information signal.

3. The optical receiver of claim 1, additionally comprising an electrical conductor extending between each of the light detectors and the information signal generator.

4. An optical receiver, comprising:
   an optical input path;
   a light detector array, including:
      a light-sensitive surface having an area, and
      light detectors each having an area and generating an electrical signal in response to light;
   an optical converging element located to focus an optical input signal received via the optical input path to form a spot on the light-sensitive surface of the light detector array, the spot having an area less than the area of the light-sensitive surface but greater than the area of one of the light detectors;
   an information signal generator that generates an electrical information signal from at least one of the electrical signals; and
   a sampling and multiplexing circuit that delivers samples of the electrical signals generated by the light detectors to the information signal generator.

5. The optical receiver of claim 4, in which:
   the sampling and multiplexing circuit has a general sampling mode in which it delivers to the information signal generator samples of the electrical signals generated by substantially all of the light detectors;
   the information signal generator identifies illuminated ones of the light detectors that generate an electrical signal in response to the optical input signal from the samples received from the sampling and multiplexing circuit in its general sampling mode;
   the sampling and multiplexing circuit additionally has a selective sampling mode in which it delivers to the information signal generator samples of at least one of the electrical signals generated by the illuminated light detectors; and
   the information signal generator generates the electrical information signal from the samples received from the sampling and multiplexing circuit in its selective sampling mode.

6. The optical receiver of claim 5, in which,
   in the selective sampling mode, the sampling and multiplexing circuit additionally delivers to the information signal generator samples of the electrical signals generated by at least one of:
      ones of the light detectors surrounding the illuminated light detectors,
      ones of the light detectors located in a regular block that includes the illuminated light detectors, and
      ones of the light detectors surrounding the regular block.

7. The optical receiver of claim 6, in which the information signal generator includes an auxiliary electrical signal selector that excludes from the samples from which the electrical information signal is generated the samples of the electrical signals generated by the ones of the light detectors that are not the illuminated light detectors.

8. The optical receiver of claim 6, in which, in the selective sampling mode, the sampling and multiplexing circuit delivers to the information signal generator samples of the electrical signal generated by only one of the illuminated light detectors.

9. The optical receiver of claim 4, in which:
the optical receiver additionally comprises at least one configurable, substantially static signal path extending between the light detector array and the information signal generator, each of the at least one configurable, substantially static signal path being configurable to connect the electrical signal generated by one of the light detectors to the information signal generator;
the information signal generator uses the samples of the electrical signals delivered by the sampling and multiplexing circuit to identify illuminated ones of the light detectors that generate an electrical signal in response to the optical input signal;
the information signal generator operates to configure the at least one configurable, substantially static signal path each to connect the electrical signal generated by one of the illuminated light detectors to the information signal generator; and
the information signal generator generates the electrical information signal from the electrical signal received via each of the at least one configurable, substantially static signal path.

10. The optical receiver of claim 9, in which the information signal generator configures the at least one configurable, substantially static signal path to deliver to the information signal generator the electrical signals generated by at least one of:
ones of the light detectors surrounding the illuminated light detectors,
ones of the light detectors located in a regular block that includes the illuminated light detectors, and
ones of the light detectors surrounding the regular block.

11. The optical receiver of claim 10, in which the information signal generator includes an auxiliary electrical signal selector that excludes from the electrical signals from which the electrical information signal is generated the electrical signals received from the ones of the light detectors located in the regular block that are not the illuminated light detectors.

12. The optical receiver of claim 9, in which the information signal generator outputs the electrical signal received via only one of the at least one configurable, substantially static signal path as the electrical information signal.

13. The optical receiver of claim 4, in which the information signal generator includes:
an illuminated detector identifier that receives the electrical signals from the light detector array and, in response thereto, generates identity information identifying the electrical signals generated in response to the optical input signal; and
an electrical signal selector that selects, as the electrical information signal, one of the electrical signals identified by the identity information as generated in response to the optical input signal.

14. The optical receiver of claim 4, in which:
the optical input signal includes optical signal components each having a different optical frequency, each of the optical signal components being modulated with a respective information signal;
the optical receiver additionally comprises a frequency-dispersive device located in an optical path between the optical converging element and the light detector array, the frequency-dispersive device spatially separating the optical signal components in the optical input signal to form respective spots on the light-sensitive surface of the light detector array; and
the information signal generator operates to identify the electrical signals generated in response to each of the optical signal components, and additionally operates to generate from the electrical signals an electrical information signal corresponding to each of the optical signal components, the information signal generator excluding ones of the electrical signals not identified as being generated in response to each of the optical signal components from the respective electrical information signal.

15. The optical receiver of claim 4, in which:
the optical input signal includes optical signal components each having a different optical frequency, each of the optical signal components being modulated with a respective information signal;
the optical receiver additionally comprises a frequency-dispersive device located in an optical path between the optical converging element and the light detector array, the frequency-dispersive device spatially separating the optical signal components in the optical input signal to form respective spots on the light-sensitive surface of the light detector array; and
the information signal generator includes:
an illuminated detector identifier that receives the electrical signals from the light detector array and, in response thereto, generates identity information identifying the electrical signals generated in response to each of the optical signal components, and
an electrical signal selector that selects, as a respective electrical information signal, one of the electrical signals identified by the identity information as generated in response to each of the optical signal components.

16. The optical receiver of claim 4, additionally comprising a mode scrambler between the optical input path and the light detector array.

17. A method of generating an electrical information signal from an optical input signal modulated with an information signal, the method comprising:
providing a light detector array, including:
a light-sensitive surface having an area, and
light detectors each having an area and generating an electrical signal in response to light;
optically converging the optical input signal to form a spot on the light-sensitive surface of the light detector array, the spot having an area less than the area of the light-sensitive surface but greater than the area of one of the light detectors; and
generating the electrical information signal from at least one of the electrical signals generated by the light detectors, including:
identifying the electrical signals generated in response to the optical input signal, the electrical signals identified as generated in response to the optical input signal being generated by respective illuminated light detectors;
excluding from the electrical information signal ones of the electrical signals not identified as being generated in response to the optical input signal; and
not excluding from the electrical information signal the electrical signals generated by at least one of:

ones of the light detectors surrounding the illuminated light detectors,
ones of the light detectors located in a regular block that includes the illuminated light detectors, the block being regular in terms of an addressing scheme of the light detector array, and
ones of the light detectors surrounding the regular block.

18. A method of generating an electrical information signal from an optical input signal modulated with an information signal, the method comprising:
providing a light detector array, including:
a light-sensitive surface having an area, and
light detectors each having an area and generating an electrical signal in response to light;
optically converging the optical input signal to form a spot on the light-sensitive surface of the light detector array, the spot having an area less than the area of the light-sensitive surface but greater than the area of one of the light detectors;
generating the electrical information signal from at least one of the electrical signals generated by the light detectors; and
sampling and multiplexing the electrical signals generated by the light detectors.

19. The method of claim 18, in which, in generating the electrical information signal, the electrical information signal is generated by summing the electrical signals generated by the light detectors.

20. The method of claim 18, in which generating the electrical information signal includes
identifying the electrical signals generated in response to the optical input signal; and
selecting, as the electrical information signal, one of the electrical signals identified as being generated in response to the optical input signal.

21. The method of claim 18, in which generating the information signal includes:
identifying the electrical signals generated in response to the optical input signal; and
excluding from the electrical information signal ones of the electrical signals not identified as being generated in response to the optical input signal.

22. The method of claim 18, additionally comprising mode scrambling the optical input signal.

23. A method of generating an electrical information signal from an optical input signal modulated with an information signal, the method comprising:
providing a light detector array, including:
a light-sensitive surface having an area, and
light detectors each having an area and generating an electrical signal in response to light;
optically converging the optical input signal to form a spot on the light-sensitive surface of the light detector array, the spot having an area less than the area of the light-sensitive surface but greater than the area of one of the light detectors; and
generating the electrical information signal from at least one of the electrical signals generated by the light detectors, including:
performing general sampling and multiplexing to provide samples of the electrical signals generated by substantially all of the light detectors,
using the samples provided by the general sampling and multiplexing to identify illuminated ones of the light detectors that generate an electrical signal in response to the optical input signal,
performing selective sampling and multiplexing to provide samples of at least one of the electrical signals generated by the illuminated light detectors, and
generating the electrical information signal from the samples provided by the selective sampling and multiplexing.

24. The method of claim 23, in which the selective sampling and multiplexing additionally provides samples of the electrical signals generated by at least one of
ones of the light detectors surrounding the illuminated light detectors;
ones of the light detectors located in a regular block that includes the illuminated light detectors; and
ones of the light detectors surrounding the regular block.

25. The method of claim 24, additionally comprising excluding from the samples from which the electrical information signal is generated the samples of the electrical signals generated by the ones of the light detectors that are not the illuminated light detectors.

26. The method of claim 23, in which, in performing the selective sampling and multiplexing, the selective sampling and multiplexing is performed to provide samples of the electrical signals generated by only one of the illuminated light detectors.

27. A method of generating an electrical information signal from an optical input signal modulated with an information signal, the method comprising:
providing a light detector array, including:
a light-sensitive surface having an area, and
light detectors each having an area and generating an electrical signal in response to light;
optically converging the optical input signal to form a spot on the light-sensitive surface of the light detector array, the spot having an area less than the area of the light-sensitive surface but greater than the area of one of the light detectors; and
generating the electrical information signal from at least one of the electrical signals generated by the light detectors, including:
performing general sampling and multiplexing to provide samples of the electrical signals generated by substantially all of the light detectors;
using the samples provided by the general sampling and multiplexing to identify illuminated ones of the light detectors that generate an electrical signal in response to the optical input signal;
configuring each of at least one configurable, substantially static signal path to connect to one of the illuminated light detectors;
receiving the electrical signal from one of the illuminated light detectors via each of the at least one configurable, substantially static signal path; and
generating the electrical information signal from the electrical signal received via each of the at least one configurable, substantially static signal path.

28. The method of claim 27, in which, in configuring each of the at least one configurable, substantially static signal path, the configurable, substantially static signal paths are configured to connect to at least one of:
ones of the light detectors surrounding the illuminated light detectors,
ones of the light detectors located in a regular block that includes the illuminated light detectors, and
ones of the light detectors surrounding the regular block.

29. The method of claim 28, additionally comprising excluding from the electrical signals from which the electrical information signal is generated the electrical signals received via the ones of the configurable, substantially static signal paths connected to the ones of the light detectors that are not the illuminated light detectors.

30. The method of claim 27, in which:
   in configuring each of at least one configurable, substantially static signal path, only one configurable, substantially static signal path is configured to connect to one of the illuminated light detectors;
   in receiving the electrical signal from one of the illuminated light detectors via each of the at least one configurable, substantially static signal path, the electrical signal from only one of the illuminated light detectors is received the one configurable, substantially static signal path; and
   in generating the electrical information signal from the electrical signal received via each of the at least one configurable, substantially static signal path, the electrical signal received via the one configurable, substantially static signal path is output as the electrical information signal.

* * * * *